United States Patent [19]

Binkley et al.

[11] Patent Number: 4,920,481

[45] Date of Patent: Apr. 24, 1990

[54] EMULATION WITH DISPLAY UPDATE TRAPPING

[75] Inventors: Joseph H. Binkley; Perry A. Caro; John B. Dillon, all of Palo Alto; Charles R. Fay, Long Beach; Jonathan Gibbons, Mountain View; Hilary N. Hooks, Newark; Abdo G. Kadifa; Jeffery W. Lee, both of Palo Alto; William C. Lynch, Palo Alto; Clayton W. Mock, Redwood City; Everett T. Neely, Montara; Michael L. Tallan, Mountain View; Geoffrey O. Thompson, Palo Alto; Gaya Vukkadala, Sunnyvale; John D. Wick, Palo Alto; Donald R. Woods, Los Altos, all of Calif.

[73] Assignee: Xerox Corporation, Stamford, Conn.

[21] Appl. No.: 130,369

[22] Filed: Dec. 8, 1987

Related U.S. Application Data

[62] Division of Ser. No. 856,526, Apr. 28, 1986.

[51] Int. Cl.[5] ..................... G06F 15/16; G06F 3/153
[52] U.S. Cl. .................................... 364/200; 364/228; 364/240.0/; 364/232.3; 364/261.6
[58] Field of Search ... 364/200 MS File, 900 MS File

[56] References Cited

U.S. PATENT DOCUMENTS

| | | | |
|---|---|---|---|
| 3,932,843 | 1/1976 | Trelut et al. | 340/172.5 |
| 3,955,180 | 5/1976 | Hirtle | 340/172.5 |
| 4,031,517 | 6/1977 | Hirtle | 364/200 |
| 4,042,914 | 8/1977 | Curley et al. | 364/200 |
| 4,253,145 | 2/1981 | Goldberg | 364/200 |
| 4,315,310 | 2/1982 | Bayliss et al. | 364/200 |
| 4,365,295 | 12/1982 | Katzman et al. | 364/200 |
| 4,456,954 | 6/1984 | Bullions, III et al. | 364/200 |
| 4,458,331 | 7/1984 | Amezcua et al. | 364/900 |
| 4,463,442 | 7/1984 | Dachowski et al. | 364/900 |
| 4,484,266 | 11/1984 | Becker et al. | 364/200 |
| 4,564,903 | 1/1986 | Guyette et al. | 364/300 |
| 4,590,556 | 5/1986 | Berger et al. | 364/200 |

(List continued on next page.)

FOREIGN PATENT DOCUMENTS

| | | |
|---|---|---|
| 0165517 | 12/1985 | European Pat. Off. |
| 0168034 | 1/1986 | European Pat. Off. |
| 0197499 | 10/1986 | European Pat. Off. |
| 0205949 | 12/1986 | European Pat. Off. |
| 0210345 | 2/1987 | European Pat. Off. |
| 0229336 | 7/1987 | European Pat. Off. |
| 0229700 | 7/1987 | European Pat. Off. |

OTHER PUBLICATIONS

Interface Age, Sep. 1984, pp. 79-81.
Interface Age, May 1984, pp. 100-107.

(List continued on next page.)

*Primary Examiner*—Thomas C. Lee
*Attorney, Agent, or Firm*—James T. Beran

[57] ABSTRACT

An emulating data processor includes a host system and an emulating processor with outputs to and inputs from the host system. The emulating processor executes sequences of instructions executable by a PC being emulated, but a host processor independently executes sequences of its instructions which are different from PC instructions. Circuitry monitors the emulating processor outputs and provides information to the host system so that it can emulate the environment of the PC CPU, emulating both memory and I/O devices. The memory accesses of the emulating processor are mapped into the host system memory, so that the host processor is protected from defective PC software on the emulating processor. The display updates of the emulating processor are detected and provide information for the host processor in updating a part of its display which provides the information a PC display would provide simultaneously with the display characteristic of the host system. An input/output processor handles I/O operation requests of the emulating processor, using the host system I/O devices to emulate some of the PC I/O devices. The host system emulates the environment of the emulating processor while emulating the user interface of the PC.

15 Claims, 29 Drawing Sheets

U.S. PATENT DOCUMENTS

| | | |
|---|---|---|
| 4,591,975 | 5/1986 | Wade et al. ............................ 364/200 |
| 4,621,319 | 11/1986 | Braun et al. ........................... 364/200 |
| 4,648,034 | 3/1987 | Heinger ................................ 364/200 |
| 4,665,482 | 5/1987 | Murray, Jr. et al. ................. 364/200 |
| 4,695,945 | 2/1987 | Irwin .................................... 364/200 |
| 4,703,420 | 10/1987 | Irwin .................................... 364/200 |
| 4,709,328 | 11/1987 | Anthony, Jr. et al. .............. 364/200 |
| 4,716,526 | 12/1987 | Mori et al. ............................ 364/200 |
| 4,722,048 | 1/1988 | Hirsch et al. ........................ 364/200 |
| 4,727,480 | 2/1988 | Albright et al. ..................... 364/200 |
| 4,729,094 | 3/1988 | Zolnowsky et al. ................. 364/200 |
| 4,757,441 | 7/1988 | Buckland et al. .................... 364/200 |
| 4,787,026 | 11/1988 | Barnes et al. ........................ 364/200 |
| 4,833,596 | 5/1989 | Buckland et al. .................... 364/200 |

OTHER PUBLICATIONS

Mark Heck, "Quadlink, Running Apple Software on an IBM PC", Interface Age, May 1984, pp. 108-110.

Robert Moskowitz, "Appli-Card Enhancing Your Apple", Interface Age, Aug. 1983, pp. 107, 108, 111.

Robert Peck, "Expanding Your Apple's Applications", Byte, Dec. 1984, pp. A45-A47, A122-126.

David Morganstein, "ALF's 8088 Coprocessor for Your Apple", Byte, Dec. 1984, pp. A38, 40-43.

Libertine, J. A., "The Xerox 16/8 Professional: A Workhorse for the Office", *Business Computer Systems*, May 1984, pp. 147, 149, 151.

Xerox Corporation, "16/8 Professional Computer", one sheet brochure.

Honeywell Information Systems Inc., "microSystem 6/10", 1985.

Xerox Corporation, "Xerox 16/8 Professional Computer—Two Computers in One—Meeting Leaders Guide", pp. 1-11, 1983.

Deitel, Harvey M., *"An Introduction to Operating Systems"*, Addison-Wesley Publishing Company, Inc., Revised First Edition, Jul. 1984, pp. 601-629.

Krishnamurty, R. and Mothersole T., "Coprocessor Software Support", *IBM Personal Computer Technology*, IBM, Austin, 1986, pp. 142-146.

Goering, R., "Apollo Entry Fuels CAAE/CAD Workstation Battle", *Computer Design*, Mar. 1, 1986, pp. 26-27.

Rose, C. D., "Apollo Fights Back with New Work Stations", *Electronics*, Feb. 24, 1986, pp. 20-21.

Hall, Dennis E., et al., "A Virtual Operating System", *Communications of the ACM*, vol. 23, No. 9, Sep. 1980, pp. 495-502.

Madnick, Stuart E. et al., "Operating Systems", McGraw-Hill Book Company, 1974, pp. 549-563.

Mace, S. and Sorension, K., "Amiga, Atari Ready PC Emulators", *InfoWorld*, vol. 8, No. 18, May 5, 1986.

"IBM Introduces High-Speed Personal of Multi-User Workstations with New Technology for Technical Professionals", *Business Wire Inc.*, Jan. 1986.

Irwin J. W., "Use of a Coprocessor for Emulating the PC AT", *IBM Personal Computer Technology*, IBM Austin, 1986, pp. 137-141.

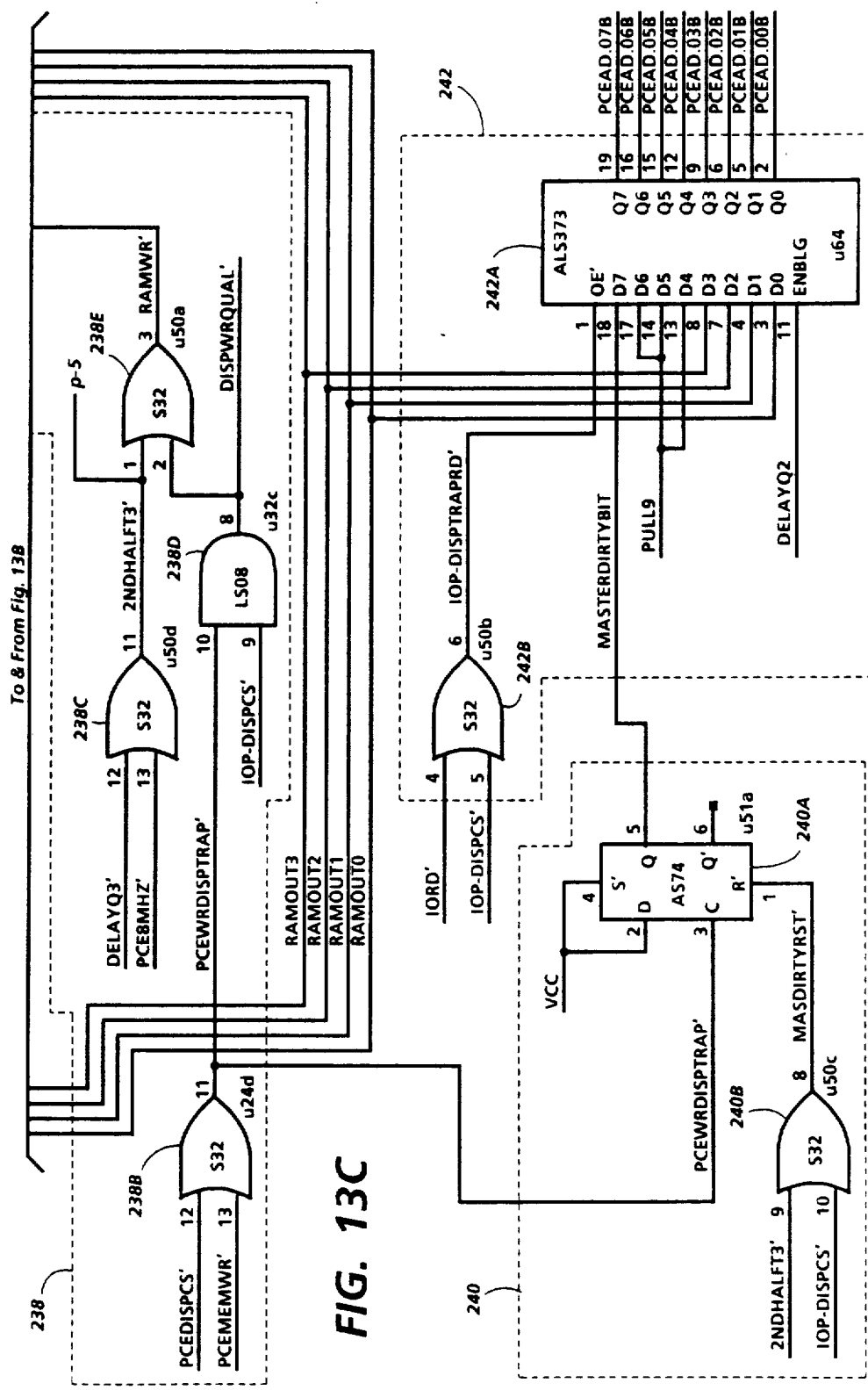

| RAM ADDRESS | PROM CONTENT | |
|---|---|---|
| | (REGISTER FILE ADDRESS) | (DIRTY BIT) |
| AA.13...AA.06 | D7-4 | D3-0 |
| 00000000 | 0000 | 0001 |
| 00000001 | 0000 | 0001 |
| 00000010 | 0000 | 0001 |
| 00000011 | 0000 | 0001 |
| 00000100 | 0000 | 0001 |
| 00000101 | 0000 | 0010 |
| 00000110 | 0000 | 0010 |
| 00000111 | 0000 | 0010 |
| 00001000 | 0000 | 0010 |
| 00001001 | 0000 | 0010 |
| 00001010 | 0000 | 0100 |
| 00001011 | 0000 | 0100 |
| 00001100 | 0000 | 0100 |
| 00001101 | 0000 | 0100 |
| 00001110 | 0000 | 0100 |
| 00001111 | 0000 | 1000 |
| 00010000 | 0000 | 1000 |
| 00010001 | 0000 | 1000 |
| 00010010 | 0000 | 1000 |
| 00010011 | 0000 | 1000 |
| 00010100 | 0001 | 0001 |
| 00010101 | 0001 | 0001 |
| 00010110 | 0001 | 0001 |
| 00010111 | 0001 | 0001 |
| 00011000 | 0001 | 0001 |
| 00011001 | 0001 | 0010 |
| 00011010 | 0001 | 0010 |
| 00011011 | 0001 | 0010 |
| 00011100 | 0001 | 0010 |
| 00011101 | 0001 | 0010 |
| 00011110 | 0001 | 0100 |
| 00111111 | 0001 | 0100 |
| 00100000 | 0001 | 0100 |
| 00100001 | 0001 | 0100 |
| 00100010 | 0001 | 0100 |
| 00100011 | 0001 | 1000 |
| 00100100 | 0001 | 1000 |
| 00100101 | 0001 | 1000 |
| 00100110 | 0001 | 1000 |
| 00100111 | 0001 | 1000 |
| 00101000 | 0010 | 0001 |
| 00101001 | 0010 | 0001 |
| ........ | ..... | ..... |

80 CHARACTERS = 1 LINE

| 1....32 | 33....64 | 65.... |
| ....96 | 97....128 | 129....160 |

| 161....192 | 193....224 | 225.... |
| ....256 | 257....288 | 289....320 |

| 321....352 | 353....384 | 384.... |
| ....416 | 417....448 | 449....480 |

| 481....512 | 513....544 | 545.... |
| ....576 | 577....608 | 609....640 |

EMULATION WITH DISPLAY UPDATE TRAPPING

This is a division of application Ser. No. 856,526, filed Apr. 28, 1986.

BACKGROUND OF THE INVENTION

The present invention relates to the emulation of one data processing system by another. More specifically, the present invention relates to the modification of a host data processing system to emulate another, dissimilar target system with a central processor (CPU) which is capable of executing a set of instructions different than those executable by the host system's CPU.

Many techniques for emulating a target data processing system are known. Such a technique may alternatively be described as a simulation of the target system, as making another system compatible with the target system, or as providing the target system as a virtual machine on a host system. U.S. Pat. No. 4,253,145 contains a helpful discussion of virtual machines in the prior art, most of which simulate mainframe computers so that programs written for the simulated computer can be run on the virtual machine.

In recent years, a vast amount of software has been written for a microprocessor-based data processing system called the IBM PC or IBM PC XT ("PC"), produced by International Business Machines Corporation. In order to make their products more useful, many manufacturers have developed systems which are either equivalent to the PC or can be made to operate in an equivalent manner by the use of software. Hardware and software technology have progressed rapidly, however, so that systems far more powerful than the PC can be produced for roughly the same cost. To devote such a system to the running of PC software is to sacrifice capabilities it could otherwise have. Therefore, it would be useful to have a technique for modifying one of these more powerful systems so that it could run software written for the PC without limiting its other capabilities.

SUMMARY OF THE INVENTION

The present invention provides techniques for modifying a system so that it can run PC software while retaining its own characteristic capabilities. For example, the present invention makes it possible for a host system capable of displaying more information than a PC to display within its own characteristic display all the information a PC would provide on its display, making that information available for manipulation by an operator using the features of the more powerful host system. Furthermore, the present invention makes it possible to execute PC software in such a manner that if the PC software cannot be executed, and therefore results in a crash, the host system will be protected and will continue to operate with full capabilities.

The present invention combines a host system with an emulating processor which is capable of running software written for a target system. The emulating processor is added as not to prevent the host system CPU from performing its own independent operations while the emulating processor is operating, even though the two processors have different instruction sets. Also, the host system can provide an external interface which includes the features of an external interface of the target system while retaining those of the host system. For example, the host system can provide a display which includes the target system display but retains the display features of the host system.

The emulating processor is thus added in a manner which protects the host system CPU from crashes in the target system software, since the host system CPU is not executing the software which leads to the crash and may continue with its independent operation. Rather than being surrounded by the devices found in the target system, the emulating processor provides its output signals to the host system and receives input signals from the host system. Those input signals from the host system enable the emulating processor to continue to run target system software. The host system continues to operate as an independent system while supporting emulation of the environment which the emulating processor would have if it were the central processor of the target system. The host system CPU can therefore continue to operate independently with its own capabilities despite failure of the emulating processor due to defective or malicious software.

A number of previous techniqes have made use of more than one processor in operations resembling emulation. None of the known techniques, however, combines a host system with an emulating processor which executes a different instruction set while the host system processor continues its independent operation. Similarly, none of the known techniques combines a host system with an emulating processor so that the host system interface for providing external transfer of signals operates in a manner characteristic of the host system while simultaneously operating in a different manner characteristic of a target system being emulated.

U.S. Pat. No. 4,564,903, for example, illustrates a technique for using more than one processor in a virtual machine system, with each of several multiprocessors executing as a virtual machine, and an I/O processor providing a channel between I/O devices and the main storage shared by the multiprocessors, the I/O processor servicing the I/O operations of the multiprocessors. U.S. Pat. No. 3,932,843 shows a similar technique in which two operational computers simulate the execution of a program on a target system for testing and development of the program, while a simulation computer simulates the peripheral equipment of the operational computers in response to their I/O operations.

It is also known to use a processor in a local terminal to access a remote computer, the display of the local terminal appearing as if it were a standard terminal of the remote computer. In this arrangement, there is no emulating processor, only the emulation of the display of the remote processor by the local terminal.

Techniques are also known in which a system is modified so that it can emulate another system by adding a board or card. These systems conventionally can operate only in one of the alternative modes at a time, however, so that an added processor is only able to perform emulation while the host system's CPU is either disabled from executing it own instructions or dedicated to servicing the I/O requests of the added processor, and therefore the host system's CPU cannot operate independently while the added processor is emulating. Furthermore, the display provides either the display of the host CPU or, if the added processor is operating, the display of the added processor, but not both at once. The host system capabilities are in effect sacrificed while the added processor is operating.

Although each of the above techniques uses more than one processor to perform emulation, none uses an emulating processor which executes a different instruction set than the host system CPU while the host system CPU continues to operate independently. Furthermore, none of the above techniques has an interface which, during emulation, provides at the same time the characteristic features of a host system interface and the characteristic features of a target system interface, which differ from the host system interface.

In emulation according to one aspect of the invention, a host system has a host processor which executes a sequence of host system instructions and performs its independent operations while an emulating processor executes a sequence of target system instructions. The host system instruction set differs from the target system instruction set. The host system receives output signals from the emulating processor and provides input signals so that the emulating processor continues executing.

The target system includes a set of devices which provides an environment, referred to as its processor environment, in which the target system's central processor executes. According to a further aspect of the invention, the host system provides an equivalent environment to the emulating processor by providing input signals to the emulating processor corresponding to the input signals provided by the target system devices and by accepting output signals from the emulating processor. The host system may include circuitry which monitors the emulating processor for an output requesting an I/O operation and provides an I/O signal. The host system may further include emulating means for emulating that target system device in response to the I/O signal. The independent operations of the host processor may include I/O operations making use of I/O devices which are also used to emulate the target system devices. A target system device which is a memory medium may be emulated using a host system file which can also be accessed by the emulating processor as a memory medium. This memory medium file may be used to transfer data under the control of one processor to the control of the other, by selecting a screen object providing access to the file, by indicating a destination such as an emulated I/O device used by the emulating processor to access that type of memory medium and by providing the file to the destination processor.

These and other objects, features and advantages of the invention will become more apparent from the attached drawings together with the following description and the appended claims.

BRIEF DESCRIPTION OF THE DRAWINGS

FIGS. 13A, 13B, and 13C are a detailed circuit diagram of the display trapper of FIG. 12.

FIG. 14 illustrates schematically the relation between the contents of the display trapper PROM of FIGS. 13A, 13B, and 13C and the regions of the PC display.

DETAILED DESCRIPTION OF THE PREFERRED EMBODIMENTS

I. General Features

Figure 1:
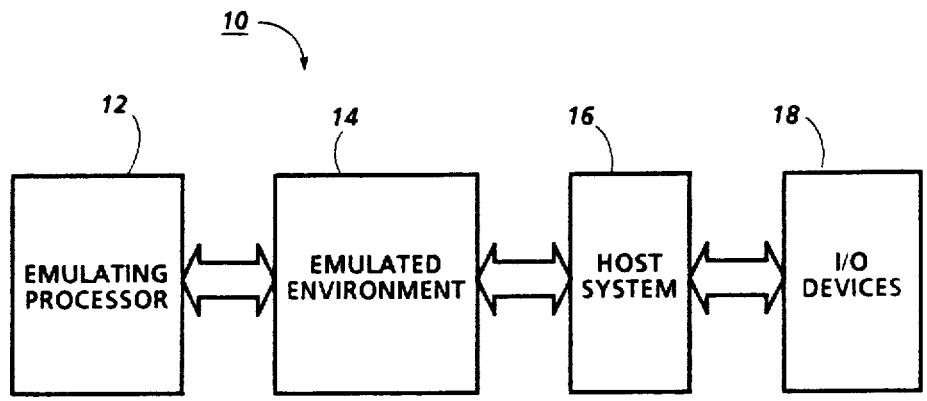
FIG. 1 is a functional block diagram showing the major components of an emulating system according to the invention.
Figure 2:
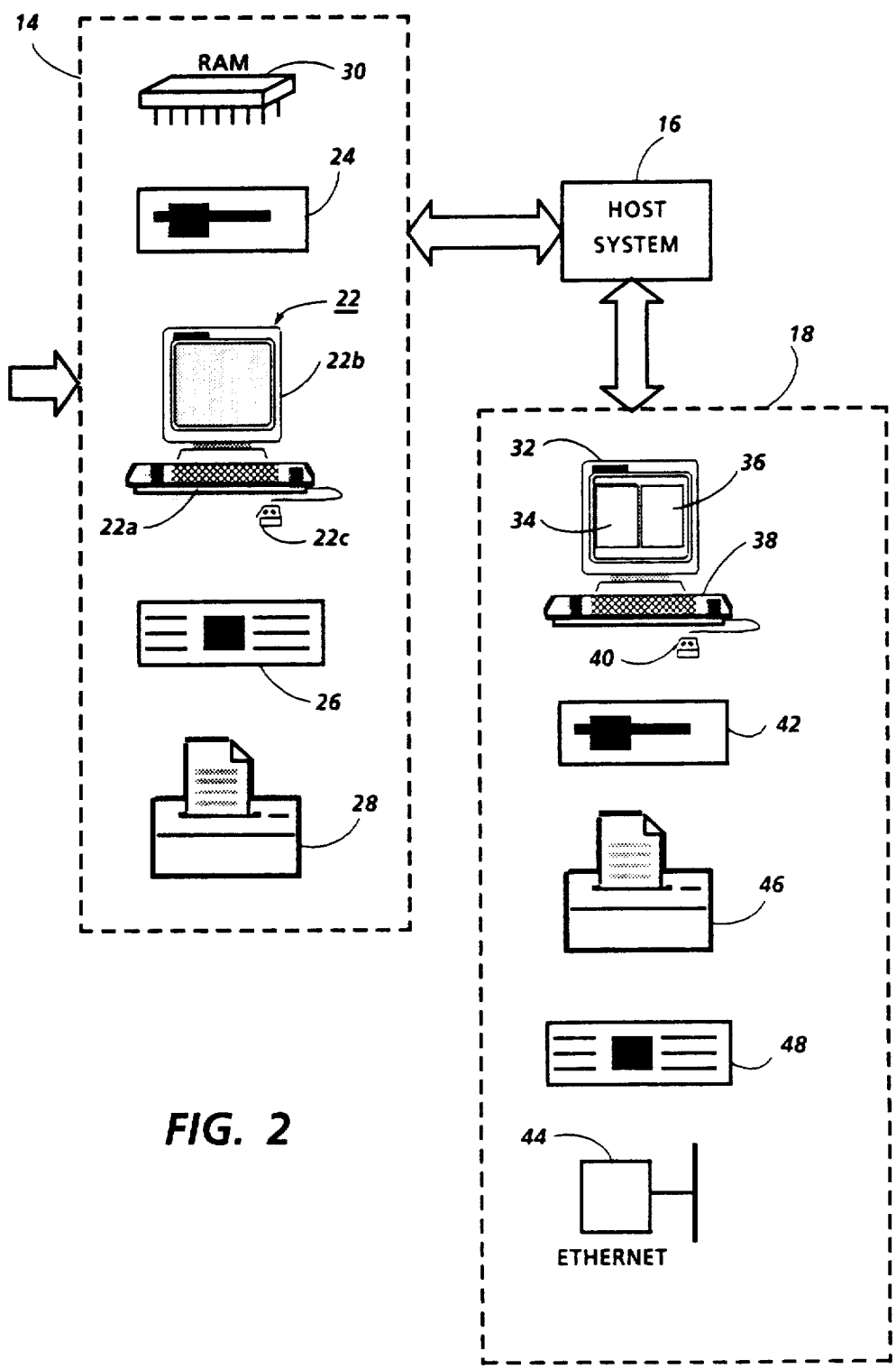
FIG. 2 is a schematic diagram illustrating emulation of the processor environment and user interface of a target system.

The general features of the invention can be understood from FIGS. 1-6. FIGS. 1 and 2 show features of systems according to the invention, while FIGS. 3-6 show features of methods according to the invention.

FIG. 1 shows the basic functional blocks of a data processing system according to the invention. As noted above, the underlying problem is that modifying a system to emulate another system ("the target system") usually sacrifices some capabilities of the system being modified. This problem is particularly acute when the system being modified is much more powerful and versatile than the target system, so that valuable capabilities are lost during emulation. System 10 in FIG. 1, however, solves this problem by providing emulation without loss of capabilities.

The focus of emulation in system 10 is the emulating processor 12, which capable of executing sequences of the same instructions which the central processor of the target system can execute. This means that if one of those sequences of instructions is presented to the emulating processor 12, it will perform operations which permit it to continue to execute that sequence until the sequence is completed. While executing, it will provide output signals and receive input signals.

If emulating processor 12 were in fact the central processor of the target system, it would be connected to a set of devices which would provide a processor environment, receiving its output signals and, in response, providing appropriate input signals to it. Therefore, even though emulating processor is capable of executing sequences of the same instructions as the target system central processor, it must also be in an environment which is equivalent to the processor environment. The emulated environment 14 in FIG. 1 represents this environment, which is in effect an interface which receives output signals from and, in response, provides input signals to emulating processor 12 corresponding to the input signals which would be provided by the set of devices in the target system. As a result, emulating processor 12 can continue to execute the sequence of instructions as if it were the target system central processor.

Emulated environment 14, rather than being provided by a set of devices as in the target system, is provided by host system 16, the system which is modified for emulation. As discussed below in greater detail, host system 16 is modified by a combination of hardware and software to provide appropriate input signals in response to output signals from emulating processor 12. These modifications are made without sacrificing the capabilities of host system 16, but rather by supplementing its capabilities, so that the resulting system has more capabilities than host system 16 by itself.

FIG. 1 also shows input and output (I/O) devices 18 connected to host system 16. Emulation would be somewhat cumbersome, however, if the user were unable to treat host system 16 as if it were the target system being emulated. Therefore, an important additional feature of the invention is to emulate the target processor's user interface in a manner which does not sacrifice the capabilities of host system 16.

FIG. 2 shows in more detail the emulated environment 14 and the I/O devices 18 which provide the emulated user interface, all supported by host system 16. The emulated environment 14 includes emulated terminal 22, with emulated keyboard 22a and emulated display monitor 22b. It would also be possible to include emulated mouse 22c as part of emulated terminal 22. Emulated environment 14 may also include emulated floppy disk drive 24, emulated fixed or rigid disk 26 and emulated printer 28. Emulated environment 14 further includes emulated main memory 30 and also includes a number of other emulated devices or components discussed below. Referring to each of these devices as "emulated" implies only that they appear to the emulating processor 12 as if an equivalent actual device were connected to it. System 10 may not in fact include a corresponding actual device, or the corresponding actual device may not in fact be involved in the operation of an emulated device. In other words, host system 16 is capable of providing input signals to emulating processor 12 in the same manner as any of the emulated devices were it present.

The actual I/O devices 18 also emulate the user interface of the target system in the manner illustrated in FIG. 2. Of particular importance is display 32, which may emulate the target system's display within a part 34 of its screen, referred to as a window. At the same time, display 32 may continue to provide the host system's display in the background around window 34, in window 36 and elsewhere on the screen. Keyboard 38, mouse 40 and floppy disk drive 42 emulate the target system user interface differently, by being operable in the conventional manner by host system 16, but with host system 16 converting input data from and output data to these devices as if they were the corresponding devices in the target system. In other words, host system 16 interprets keystrokes, mouse clicks and data read from a floppy as if they were coming respectively from the target system keyboard, mouse and floppy disk drive. Network or Ethernet connection 44 may also be provided, permitting access to remote printers or workstations. Local printer 46 could also be provided, and it may be fed data as if it were the target system printer. The rigid disk 48 also participates in user interface emulation by providing an emulated rigid disk and virtual floppy disks which the user may treat as if they were part of the target system.

The specific emulated devices and actual I/O devices shown in FIG. 2 are merely illustrative. These devices would be appropriate for emulation of an IBM PC by a Xerox 6085 workstation, but other devices could be provided for emulation of other target systems by other host systems. The basic principle of emulating the processor environment and the user interface is extremely useful for an emulation implemented according to the invention.

Figure 3:
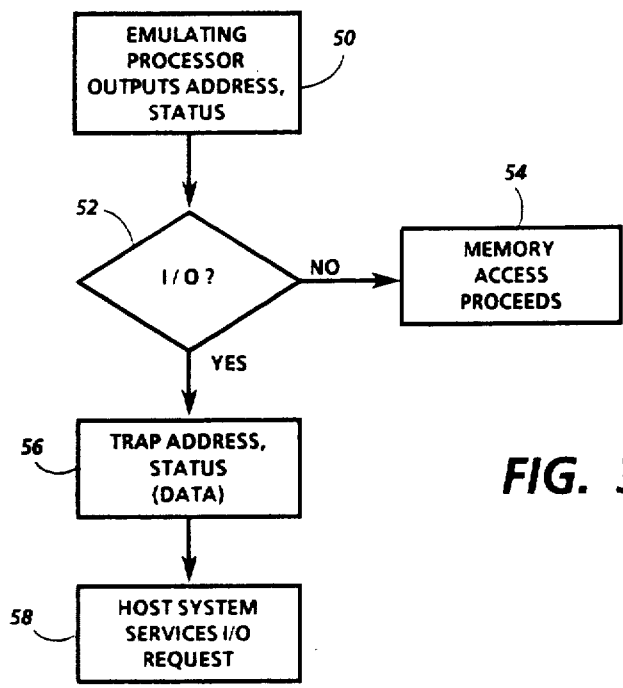
FIG. 3 is a flowchart showing basic steps in emulation of a target system's processor environment according to the invention.

FIG. 3 is a flowchart showing basic functional steps in emulation of the emulating processor's environment according to the invention. In box 50, emulating processor 12, during execution of a sequence of target system instructions, outputs information, such as an address and a number of bits of status information, indicating a type of operation. The operation may be a memory access or an I/O device operation. This information is received by a part of host system 16 which then determines in box 52 whether the requested operation is an I/O device operation.

If the requested operation is not an I/O device operation, host system 16 permits or enables the memory access by emulating processor 12 to proceed, in box 54. Emulating processor 12 may read or write to its main memory which is mapped into the host system memory as discussed below.

If the test in box 52 determines that an I/O device operation was requested, the information output by emulating processor 12 is trapped or stored, including address, status and, if an output operation is requested, data information, in box 56. Then host system 16 services the I/O request by emulating the I/O device requested, in box 58, providing appropriate inputs to enable emulating processor 12 to continue to execute the sequence of instructions.

Figure 4:
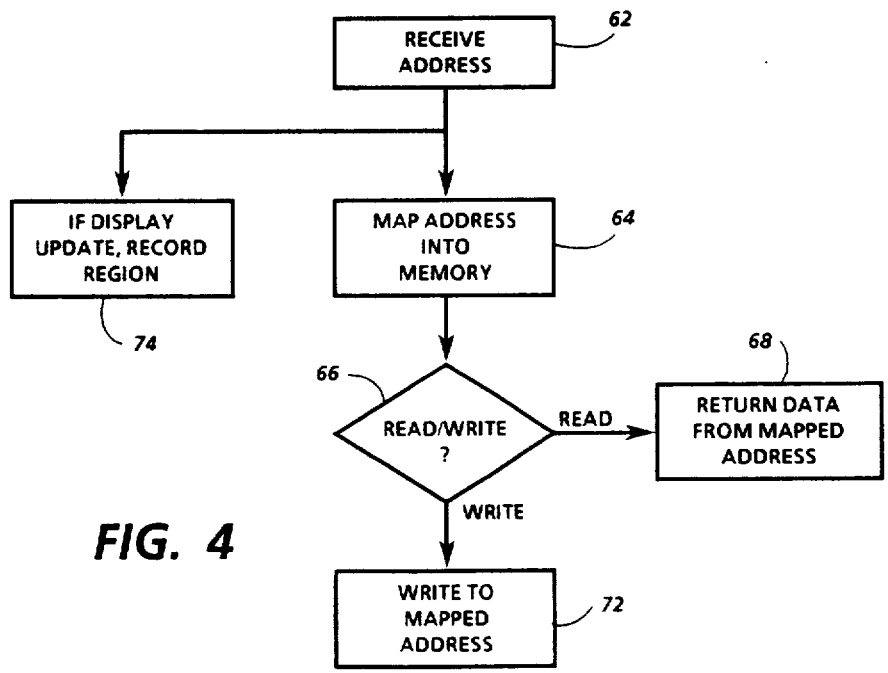
FIG. 4 is a flowchart showing a general technique for main memory emulation by memory mapping according to the invention.
Figure 5:
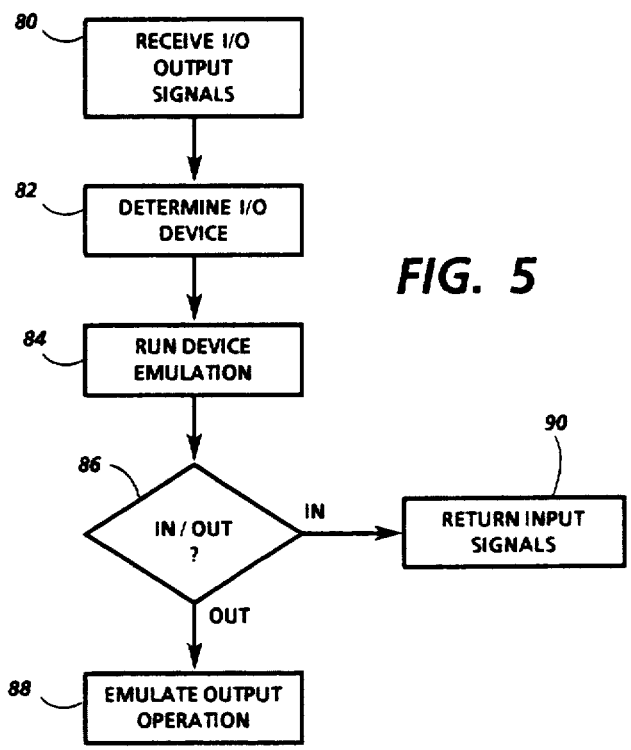
FIG. 5 is a flowchart showing a general technique for I/O device emulation according to the invention.

FIGS. 4 and 5 are generalized flowcharts showing in more detail how host system 16 performs some of the functions in FIG. 3. FIG. 4 shows how host system 16 may provide emulated main memory 30 during a memory access in box 54 in FIG. 3 and FIG. 5 shows how host system 16 may emulate an I/O device in emulated environment 14 while servicing an I/O request in box 58 in FIG. 3.

The main memory emulation technique of FIG. 4 permits host system 16 to allocate any appropriate part of memory to be the main memory for the emulating processor, while permitting host system 16 itself to also access that memory for its own purposes. In box 62, host system 16 receives an address from emulating processor 12. In box 64, host system 16 maps the address received according to an algorithm which is transparent to emulating processor 12. If emulating processor 12 calls for a read operation, as determined in box 66, host system 16 returns the data from the mapped address to emulating processor 12, as shown in box 68. But if a write operation is called for, host system 16 writes the data from emulating processor 12 to the mapped address in box 72. In box 74, concurrently with the above operations, another circuit in host system 16 receives the address and detects whether data is being written to a display bank in memory. If so, the updated display region is recorded. Subsequently, host system 16 retrieves the recorded information and updates the actual display, as discussed below in relation to FIG. 6.

FIG. 5 shows a technique for emulating an I/O device such as a floppy disk drive, keyboard, fixed disk drive, or printer. Host system 16 receives output I/O signals from emulating processor 12 in box 80, including address, status and, if an output I/O request, data, as mentioned above, and determines in box 82 to which I/O device the signals are directed. Then, in box 84, host system 16 calls a routine which emulates that device, making use of any appropriate resources actually available to host system 16, which may include a corresponding actual I/O device or dissimilar I/O devices. During the emulation routine, a test as in box 86 typically determines whether the I/O request is an output (OUT) or input (IN) request. An OUT request is typically handled by emulating the output operation, in box 88, while an IN request is typically handled by returning appropriate input signals in box 90. A number of specific emulation routines are discussed in greater detail below.

Emulating process or 12 typically accesses memory frequently, in order to retrieve its instructions and manipulate its data. I/O device operations are only requested occasionally, however, and emulating processor 12 typically operates so that the I/O device has more time in which to provide the responsive input signals. Therefore, the hardware and software implementation of memory emulation, as summarized in FIG. 4, is much different than I/O device emulation, summarized in FIG. 5, as is more fully described below.

We have already noted that the emulation of the target system's user interface is relatively straightforward for such devices as the keyboard and floppy disk drive. In each of these cases, it is basically necessary to convert or translate data into the form it would have if it had been generated or stored on the emulated device. The emulation of the display, however, is a special case, due to the problem of providing a display simultaneously having the characteristics of the target system display and the characteristics of the host system display. As with the more straightforward devices, it may be necessary to convert or translate the display update data from emulating processor 12, but it will also be necessary to integrate the data into a display with display data from host system 16.

Figure 6:
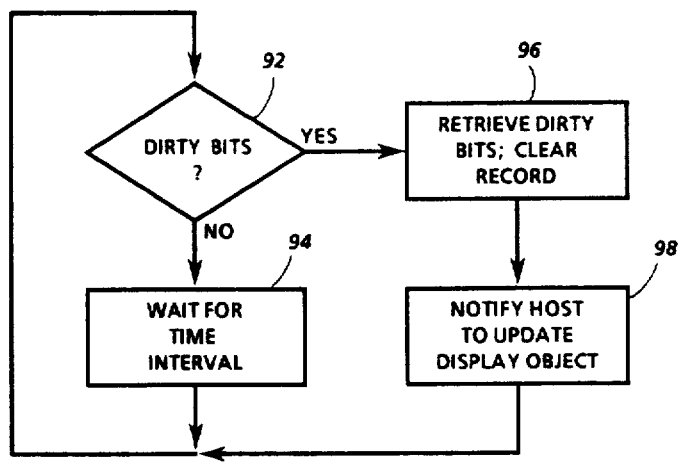
FIG. 6 is a flowchart showing a general technique for display emulation according to the invention.

FIG. 6 shows a technique according to the invention which solves this problem, enabling host system 16 to present a display characteristic of the host system which includes an emulated display characteristic of the target system based on data from emulating processor 12. This technique depends on information recorded in the step in box 74 in FIG. 4, in which a circuit in host system 16 records the region of the display which has been updated when emulating processor 12 writes data to its display bank in memory, which may be a character buffer or a bitmap memory. The technique of FIG. 6, however, is asynchronous with the step in box 74, even though it is performed by another part of host system 16.

In box 90, host system 16 determines whether any of the display regions have been updated based on the information recorded in box 74, if any. The record for each region may be a bit, referred to as a dirty bit, indicating when set that that region has been updated. If none of the dirty bits have been set, host system 16 waits for a time interval in box 94 before again performing the test in box 92. But if at least one dirty bit has been set, all of the dirty bits are retrieved and the record of dirty bits is cleared, in box 96. In box 98, another part of host system 16 is notified that the dirty bits have been retrieved, and proceeds to update a display object for the emulated display. In doing so, host system 16 will retrieve data from the emulating processor's display bank and will convert that data, if necessary, before loading it into the display object's data structure. The display object's data structure, however, is managed in much the same manner as other display object data structures in host system 16, so that even though its contents have the characteristics of a target system display, those contents appear within a display characteristic of the host system.

A display object structure includes data which can be loaded into the host system bitmap memory by software running on the host system CPU, and which will then occupy only a part of the display, such as a window. The manner in which the data is loaded and the size and location of this window are determined by the software which loads the display object into the bitmap memory, preferably under control of the user. This elegant solution provides a display which can include both an emulated screen characteristic of the target system in a window and a background display including other windows and other display features characteristic of host system 16. This opens up the possibility of transferring data between the emulated screen and other windows under user control, a feature discussed in greater detail in coassigned U.S. patent application Ser. No. 856,525, incorporated herein by reference in its entirety.

The general features of the invention described above could be implemented in many ways with any of a multitude of different host systems emulating any of a multitude of target systems. The following detailed description shows more specifically how the Xerox 6085 system may be modified to emulate the IBM PC.

II. Host System Architecture

Implementation of the invention on a specific host system will depend heavily on that host system's architecture. Yet the invention could be implemented on any host system of suitable architecture and processing capabilities. The architecture of the host system must, of course, permit transfer of data as necessary between the emulating processor and the host system.

Figure 7:
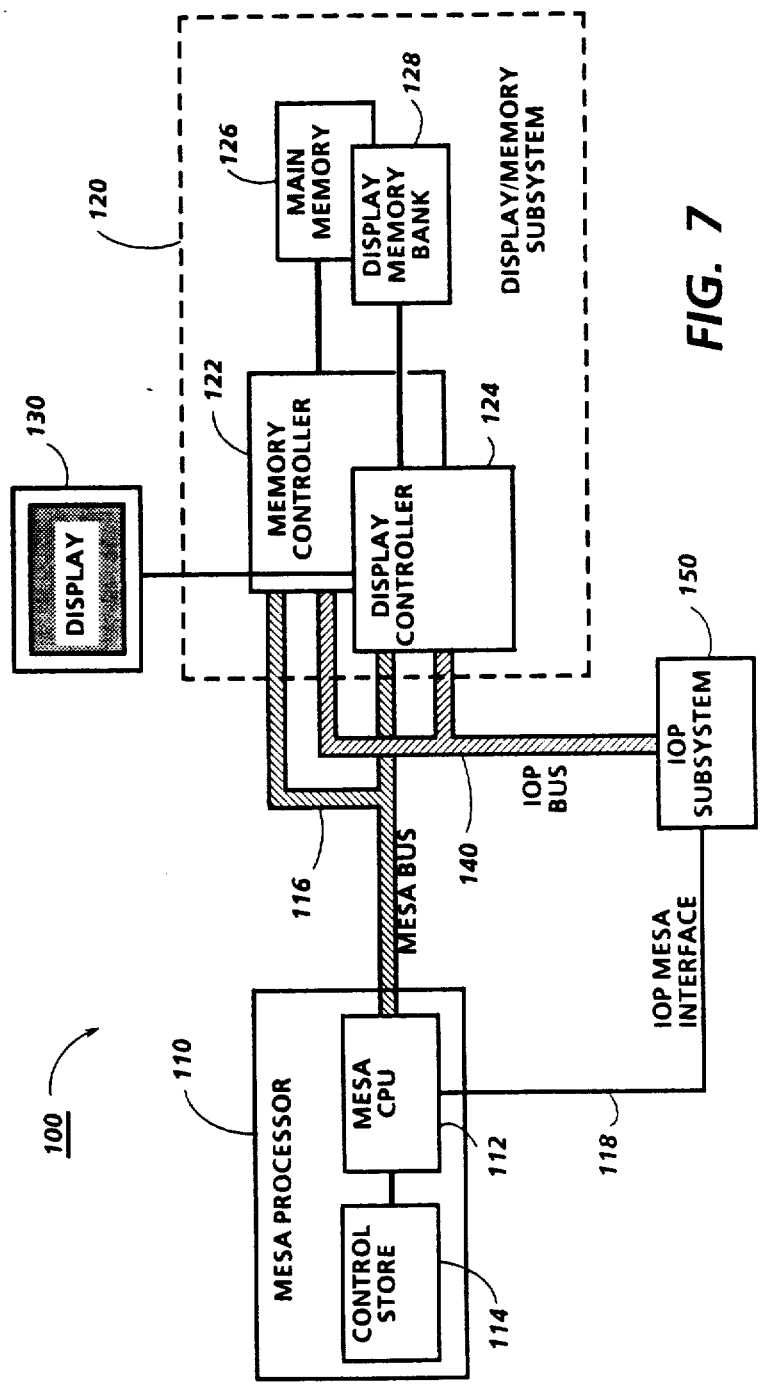
FIG. 7 is a block diagram showing a host system architecture like that of the Xerox 6085.

FIG. 7 shows the major subsystems of a system 100 with an architecture like the Xerox 6085. The main processor in system 100 is the Mesa processor 110, including Mesa CPU 112 and its control store 114. The Mesa processor 110 may be implemented in a number of ways, but is currently implemented as discrete components on a printed circuit board which, when running a microcoded Mesa emulator stored in control store 114, provides the architecture defined in the *Mesa Processor Principles of Operation,* Version 4.0, (May 1985) Xerox Corporation. Mesa processor architecture is further discussed in Johnsson, R. K. and Wick, J. D., *An Overview of the Mesa Processor Architecture,* Proc. of the Symposium on Architectural Support for Programming Languages and Operating Systems, Palo Alto, March 1982, also appearing in SIGARCH Computer Architecture News 10(2) and SIGPLAN Notices 17(4). Any suitable processor of comparable power could be used in place of Mesa processor 110 in system 100, and it may be preferable to implement Mesa CPU 112 on a single VLSI chip. Mesa processor 110 is connected by Mesa bus 116 to display/memory subsystem 120 and by an input/output processor (IOP)-Mesa interface 118 to the IOP subsystem 150.

Display/memory subsystem 120 includes memory controller 122 and display controller 124, each of which is connected to Mesa processor 110 by Mesa bus 116 and also to IOP subsystem 150 by IOP bus 140. These controllers are also currently implemented as components on printed circuit boards, but they may also each be implemented as a VLSI chip, with compatibility obtained by using the same chip for both controllers or by other appropriate means. Memory controller 122 controls main memory 126, determining which of several components, including Mesa processor 110 and IOP subsystem 150, currently has access to main memory 126 and providing memory refresh as necessary. Display controller 124 similarly controls access to display bank 128, which contains the bitmap memory, and reads from it to provide information for display on display monitor 130.

The subsystems described above remain substantially the same with or without the emulation feature of the present invention. As discussed below, Mesa CPU 112 executes some additional software during emulation. Parts of main memory 126 are used to store information to emulate the main memory of the emulating processor 12 and to emulate the devices which provide the processor environment, and it is helpful to have two sets of mapping registers in memory controller 122, as discussed below. Otherwise, the changes which must be made in system 100 to perform emulation according to the invention are in IOP subsystem 150.

FIG. 8 shows system 100 again, but with IOP subsystem 150 shown in greater detail. IOP bus 140 is the main data path through IOP subsystem 150. The components connected to it include controllers for a number of I/O devices, including floppy disk controller 142, connected to floppy disk drive 152; Ethernet controller 144 connected to Ethernet 154; rigid disk controller 146, connected to rigid disk drive 156; serial controller 148a, connected to receive signals from keyboard 158, including mouse signals; and serial controller 148b, connected to an RS232C port. The processor responsible for servicing these controllers is the I/O processor (IOP) 160, which may be an Intel 80186 microprocessor, as discussed below. IOP 160 also has access to RAM 162 and EPROM 164, which are connected to IOP bus 140. A bus arbiter/mode control, discussed below, arbitrates bus control requests from Ethernet controller 144, rigid disk controller 146 and IOP 160.

Figure 8:
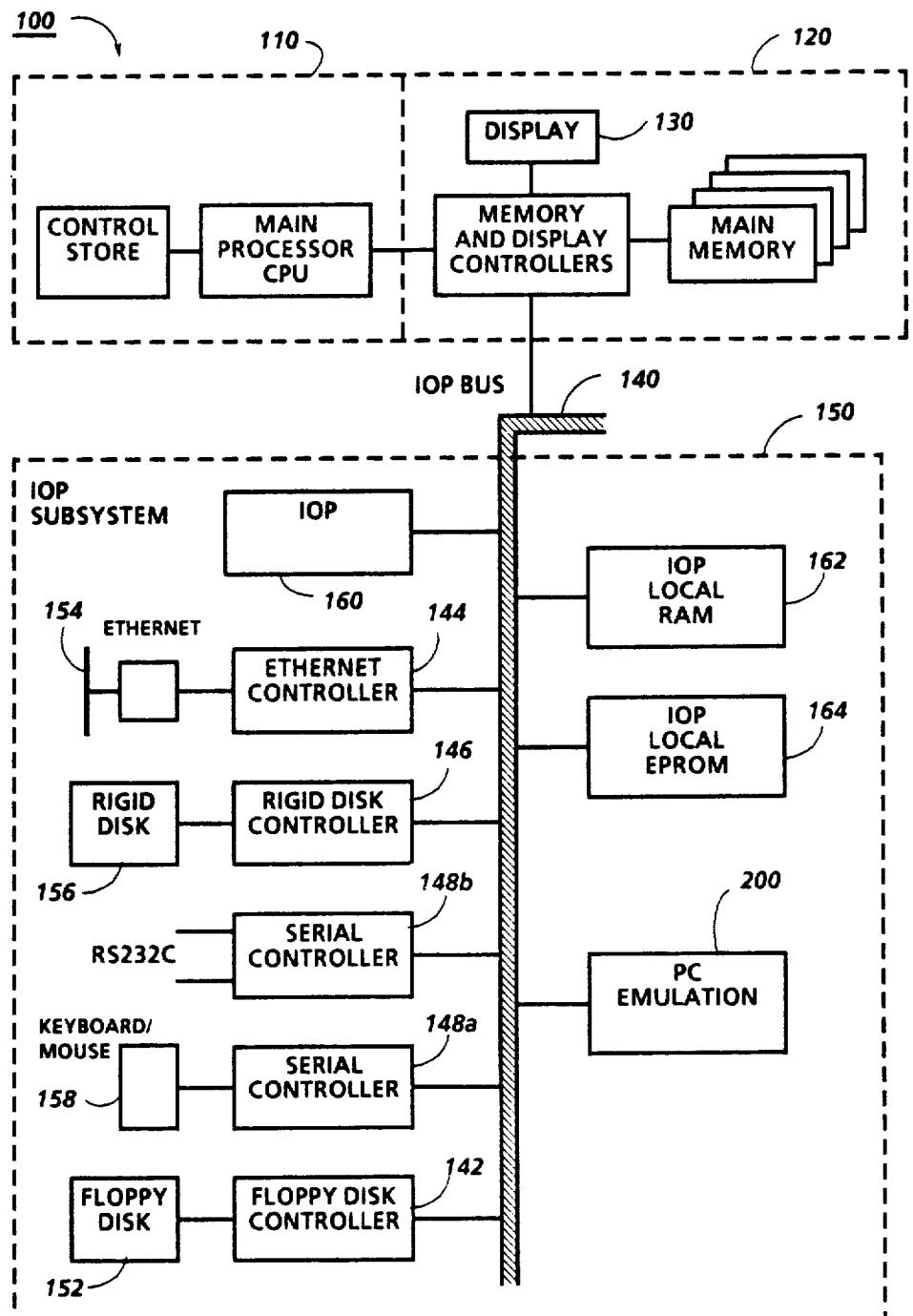
FIG. 8 is a block diagram showing in more detail the IOP subsystem of FIG. 7, including the PC emulation option according to the invention.

FIG. 8 shows PC Emulation (PCE) option 200 attached to IOP bus 140 in order to implement the present invention on system 100. PCE option 200 is preferably a discrete unit, such as a printed circuit board with attached components, so that it can be installed as an extension of IOP bus 140 without otherwise modifying the hardware of system 100. It may be necessary, however, that some components within IOP subsystem 150 and memory controller 122 be designed to accept PCE option 200. The emulating processor is within PCE 200, as discussed below.

Figure 10:
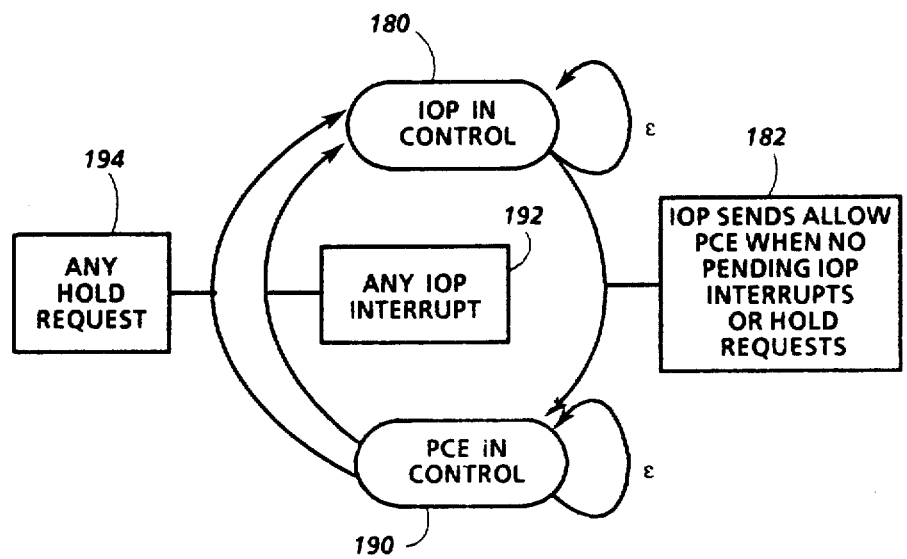
FIG. 10 is a state diagram of the mode control operation of bus arbiter/mode control of FIGS. 9A and 9B.
Figure 9A:
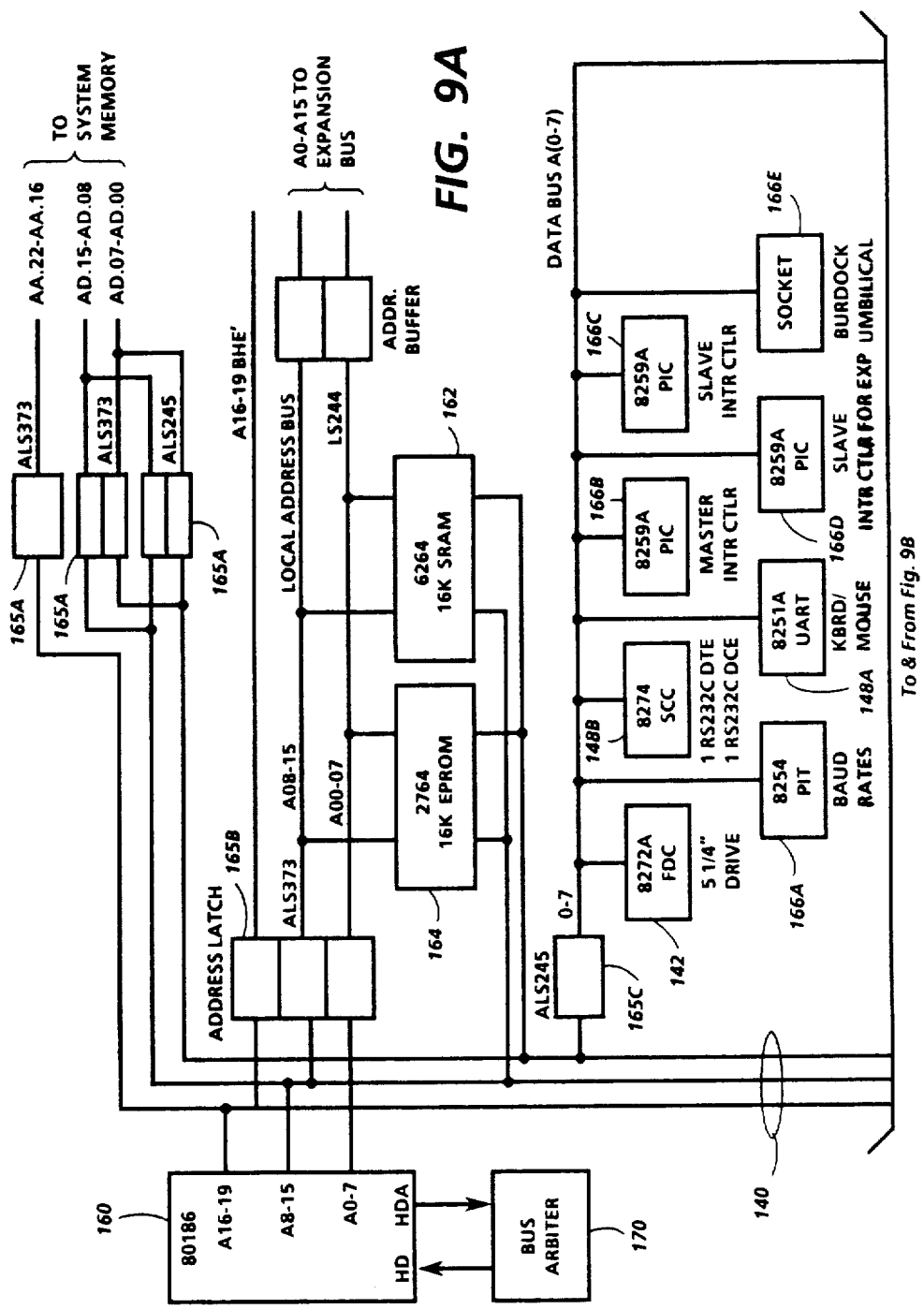
FIGS. 9A and 9B are generalized circuit diagram showing in greater detail the components of the IOP subsystem of FIG. 8.
Figure 9B:
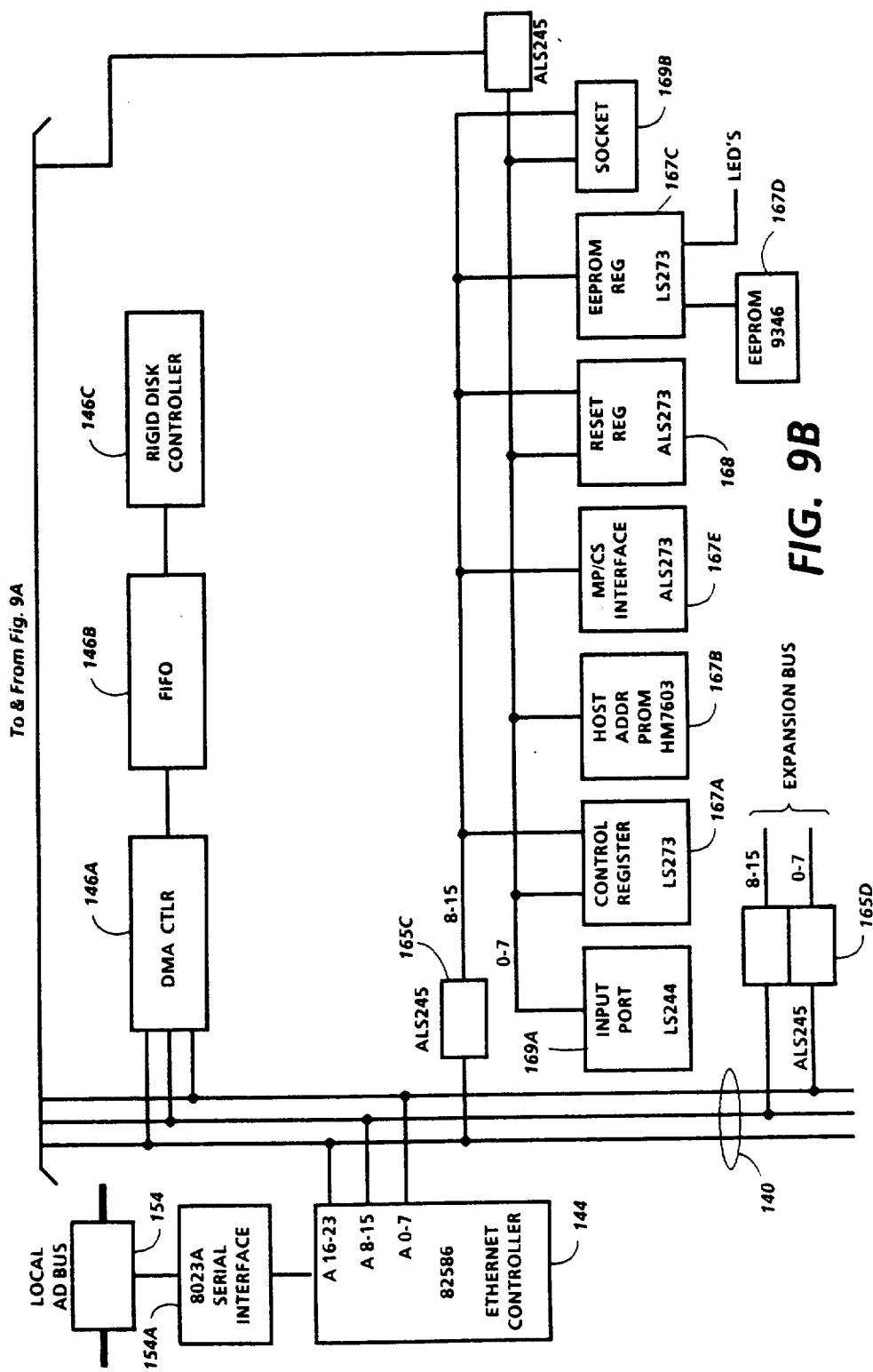

FIGS. 9A and 9B show the IOP bus structure of FIG. 8 in more detail, with many of the same components being shown with like reference numerals and with part numbers. Rigid disk controller 146 is connected to bus 140 through DMA controller 146a and FIFO buffer 146b. Ethernet controller 144 is connected to Ethernet 154 through serial interface 154a. FIG. 9A also shows bus arbiter/mode control 170 connected to IOP 160 so that arbiter/mode control 170 can send a hold request to IOP 160, which can reply with a hold acknowledge signal. FIG. 10, discussed below, provides more details about the mode control feature of arbiter/mode control 170.

FIGS. 9A and 9B show a number of additional connections to bus 140, generally involving buffers, drivers or latches, all of which are referred to below as connectors. Connectors 165a connect IOP bus 140 to the part of IOP bus 140 on the backplane, to which PCE option 200 is also connected. Connectors 165b connect to RAM 162 and EPROM 164, discussed above. Connectors 165c connect the data bus to a number of components, including floppy disk controller 142 and serial controllers 148a and 148b, discussed above, and additional components discussed below. Connectors 165c connect to an expansion bus for connecting additional options to the IOP bus 140.

The components connected through connectors 165c also include timer 166a, interrupt controllers 166b, 166c and 166d and socket 166e. Timer 166a provides timing signals to other components, such as serial controllers 148a and 148b. Master interrupt controller 166b receives interrupt request signals from a number of devices, several of which, including Mesa CPU 112, provide their requests through slave interrupt controller 166c, which may in turn receive interrupt requests from expansion bus devices through slave interrupt controller 166d. PCE 200 provides its interrupts directly to master controller 166b as the lowest priority interrupts. When no higher priority interrupts are present, master controller 166b will provide an interrupt request to IOP 160, also received by arbiter/mode control 170, and will also provide the starting address of the routine for servicing that interrupt. The routine for servicing a PCE interrupt is discussed below. Socket 166e provides a connection which can be used for debugging by connecting to another system.

Additional components connected through connectors 165c include control register 167a, host address PROM 167b, EEPROM register 167c, EEPROM 167d, MP/CS interface 167e, reset register 168, input port 169a and socket 169b. Control register 167a receives signals from IOP 160 and provides appropriate control signals to a number of I/O devices, including the speaker and floppy disk drive. Host address PROM 167b holds the unique Ethernet address of system 10, and can be accessed by IOP 160. EEPROM register 167c drives a number of LEDs and holds data used in writing EEPROM 167d at the time system 10 is installed. EEPROM 167d stores the configuration information for system 10 which is read at boot, and, for example, will contain data indicating whether PCE option 200 is included in system 10 or not. MP/CS interface 167e is a connector to the Mesa CPU 112 and its control store 114, a RAM, making it possible for IOP 160 to send and receive signals with CPU 112 and to write control store 114 in order to load it during boot of system 10. Reset register 168 receives signals from IOP 160 and provides appropriate reset signals to a number of devices, including PCE 200, Mesa CPU 112 and most of the I/O device controllers. Input port 169a is a port to a number of manual switches, permitting direct operator input for operation and testing of system 10. Socket 169b permits connection to bus 140 for debugging purposes.

Except as noted above, many of the components in FIGS. 9A and 9B do not relate directly to PCE 200. In addition to arbitrating requests from DMA controller 146a and Ethernet controller 144 for use of bus 140, however, arbiter/mode control 170 switches bus 140 between two modes, one in which IOP 160 has control and another in which a processor in PCE 200 has control. FIG. 10 shows a state diagram illustrating the mode control operation of arbiter/mode control 170. Circuitry to implement this state diagram could be implemented in many ways, including a circuit with discrete logic components or a dedicated VLSI chip.

In FIG. 10, IOP has control of IOP bus 140 in state 180. This control is subject, however, to requests from DMA controller 146a and Ethernet controller 144 for use of bus 140, each of which may have priority over IOP 160. Such requests will therefore result in a hold request to IOP 160, and, when IOP 160 acknowledges the hold, the requesting controller will take control of the bus as needed. Upon completion of such operations, control will return to IOP 160, so that the mode control remains in box 180.

The only transition to another state from state 180 is transition 182, which occurs when IOP 60 sends a command to allow PCE 200 to have control of bus 140 at a time when no hold requests or interrupts to IOP 160 are pending. All other events follow the epsilon transition back to state 180, as shown. If IOP 160 sends the allow PCE command when an IOP interrupt or hold request is pending, this epsilon transition will be followed.

When transition 182 occurs, the mode control enters state 190, in which PCE 200 has control of bus 140. In this state, PCE 200 can access memory 126 through bus 140 and can proceed to execute a sequence of instructions until one of the transitions back to state 180 occurs. Transition 192 occurs whenever an interrupt is asserted to IOP 160, including an interrupt indicating the PCE 200 has requested an I/O operation. Similarly, transition 194 occurs whenever a hold request is made, such as on behalf of DMA controller 146a or Ethernet controller 144. PCE 200 does not originate hold requests. As long as neither an IOP interrupt nor a hold request occurs, all events will follow the epsilon transition back to state 190, and PCE 200 will retain control of bus 140.

In effect, IOP 160 invites PCE 200 to use bus 140 at appropriate times as determined by IOP software. If no IOP interrupts or hold requests are pending when the invitation occurs, PCE 200 then takes control of IOP bus 140 and continue to operate until IOP 160 or another device asserts control or until PCE 200 requires I/O operations to be performed by IOP 160. In addition to performing mode control according to FIG. 10, arbiter/mode control 170 contains circuitry which, when a hold signal is sent to PCE 200 to cause it to relinquish control of bus 140, prevents other circuitry from taking over bus 140 until PCE 200 acknowledges the hold. Arbiter/mode control 170 contains additional circuitry, not shown, which arbitrates between requests from rigid disk controller 146, Ethernet controller 144 and IOP 160 and which ensures that when an interrupt occurs, IOP 160 services it. The arbitration circuitry may treat a hold acknowledge from PCE 200 substantially the same as a hold acknowledge from IOP 160.

The software modifications which accompany the addition of PCE option 200 are discussed in greater detail below, but first we turn to a discussion of the architecture of PCE option 200.

III. PCE Board Structure

Figure 11:
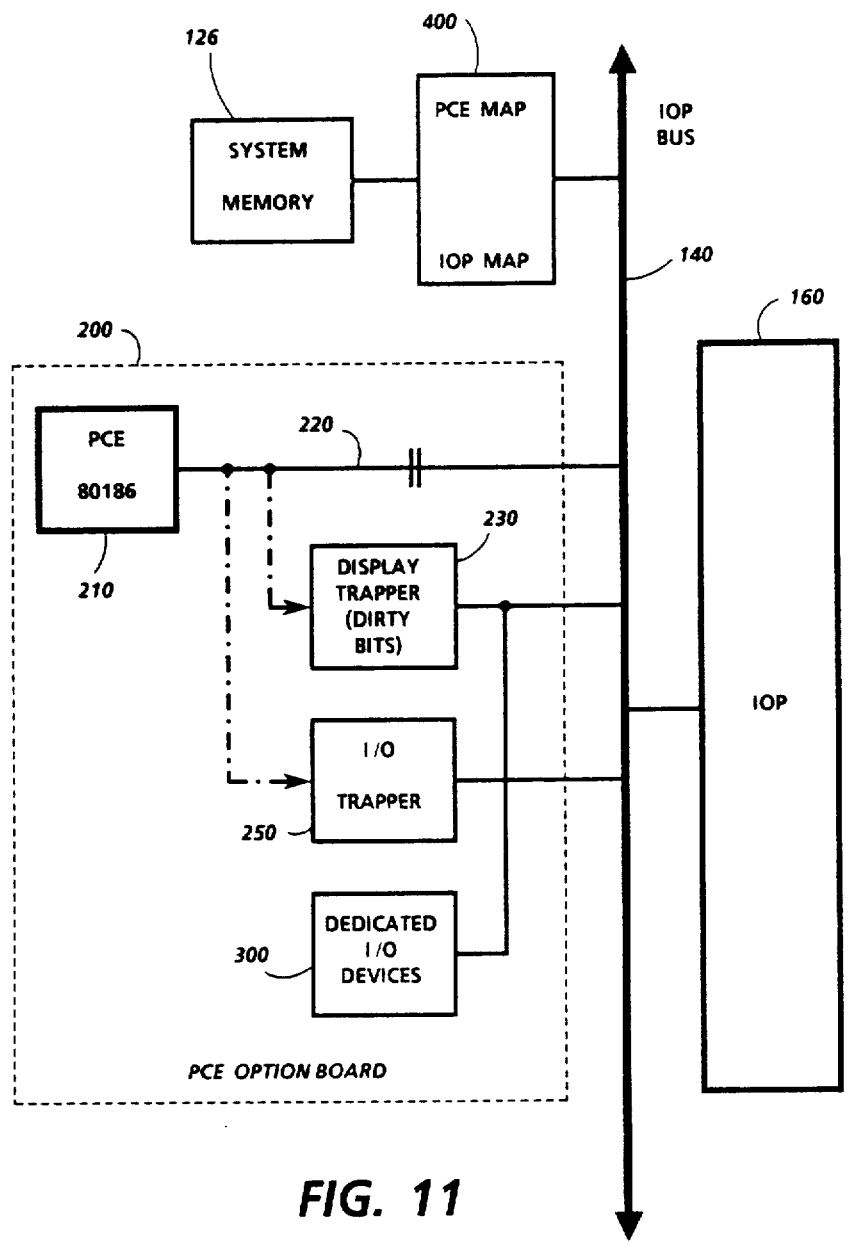
FIG. 11 is a block diagram of the components of the PC emulation option of FIG. 8.

PCE option 200 may conveniently be implemented as a separate board which may be added to system 10 by connecting it to IOP bus 140 on the backplane. FIG. 11 shows the major functional components of PCE option 200, including PCE CPU 210, an 80186 which operates as a coprocessor with IOP 160; PCE bus 200, which serves as the PCE board bus and which also serves as an extension of IOP bus 140 during memory transactions; display trapper 230; I/O trapper 250; and dedicated I/O devices 300.

FIG. 11 also shows how both IOP 160 and PCE CPU 210 are connected to system memory 126 through mapper 400, discussed below in relation to memory emulation. As will be seen, the mapper 400 connects each of the 80186 processors to its own respective section of memory based on the address provided by the respective processor. A set of mapping registers for each processor provides the high order bits for addressing that processor's section of memory.

Display trapper 230 and I/O trapper 250 monitor the operations of PCE CPU 210 for display updates and I/O operations, respectively. Upon detecting an I/O operation, I/O trapper stoes or traps relevant PCE CPU 210 outputs and then signals IOP 160 with an interrupt. As discussed in greater detail below, IOP 160 takes control of IOP bus 140, retrieves the trapped data, and performs the appropriate operations to permit PCE CPU 210 to continue to execute a sequence of IBM PC instructions when it again has control of IOP bus 140. Display trapper 230, on the other hand, simply records the display regions which have been updated in the form of dirty bits, and IOP 160 asynchronously retrieves the dirty bits and requests a display update. Therefore display trapper 230 is substantially different than I/O trapper 250.

A. Display trapper

Figure 12:
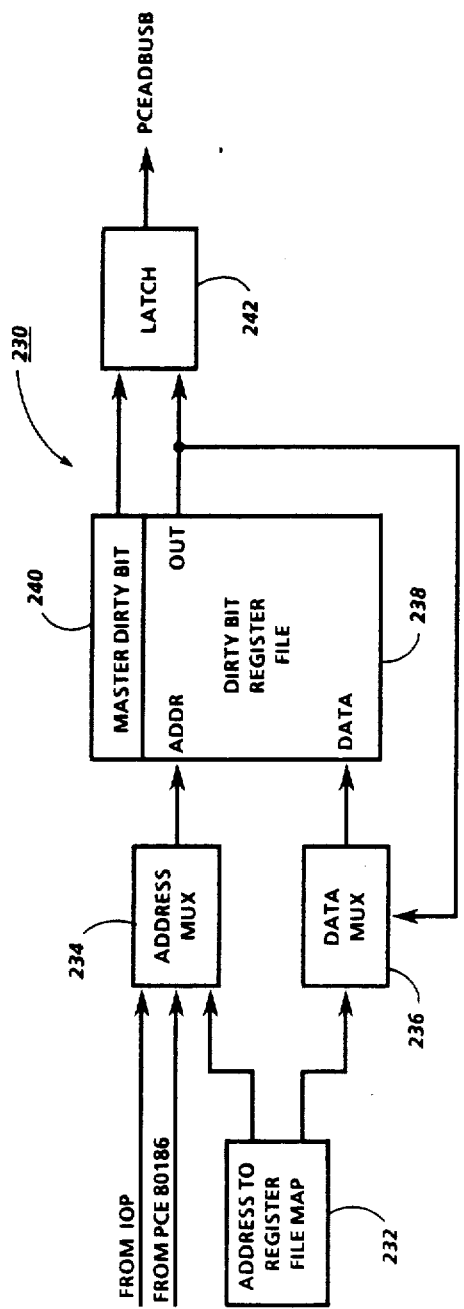
FIG. 12 is a block diagram of the display trapper of FIG. 11.

Display trapper 230 monitors the updating of display memory by PCE CPU 210 and records which area of the display was updated. FIG. 12 shows the major functional blocks within an embodiment of display trapper 230.

Address to register file map 232 receives an address from PCE CPU 210, and provides two outputs—an address output and a data output. The address output indicates which sector of the PCE display memory is being updated, while the data output indicates more precisely what part of that sector is updated by providing a bit corresponding to each part. If a part is updated, its bit is changed from 0 to 1, referred to as a "dirty bit".

Address multiplexer (MUX) 234 receives the address output from file map 232 and may also receive address outputs from IOP 160. In response to control signals from IOP 160 and PCE CPU 210, address MUX 234 provides the appropriate address at its output. Similarly, data MUX 236 receives the data output from file map 232 and also receives data output from dirty bit register file 238, and provides the appropriate data at its output in response to control signals from IOP 160 and PCE CPU 210.

Dirty bit register file 238 receives the address from address MUX 234 and the data from data MUX 236, together with control signals indicating whether to perform a read operation or to write the data received at the address received. As dirty bits are received from file map 232 through data MUX, they are stored in corresponding locations in register file 238 through a series of write operations, until IOP 160 reads them, at which time the locations read are cleared of all dirty bits. Master dirty bit store 240 contains a single bit indicating whether any dirty bits have been stored in any of the registers in register file 238. Latch 242 holds the outputs from register file 238 and master dirty bit store 240 for subsequent reading by IOP 160.

Figure 13A:
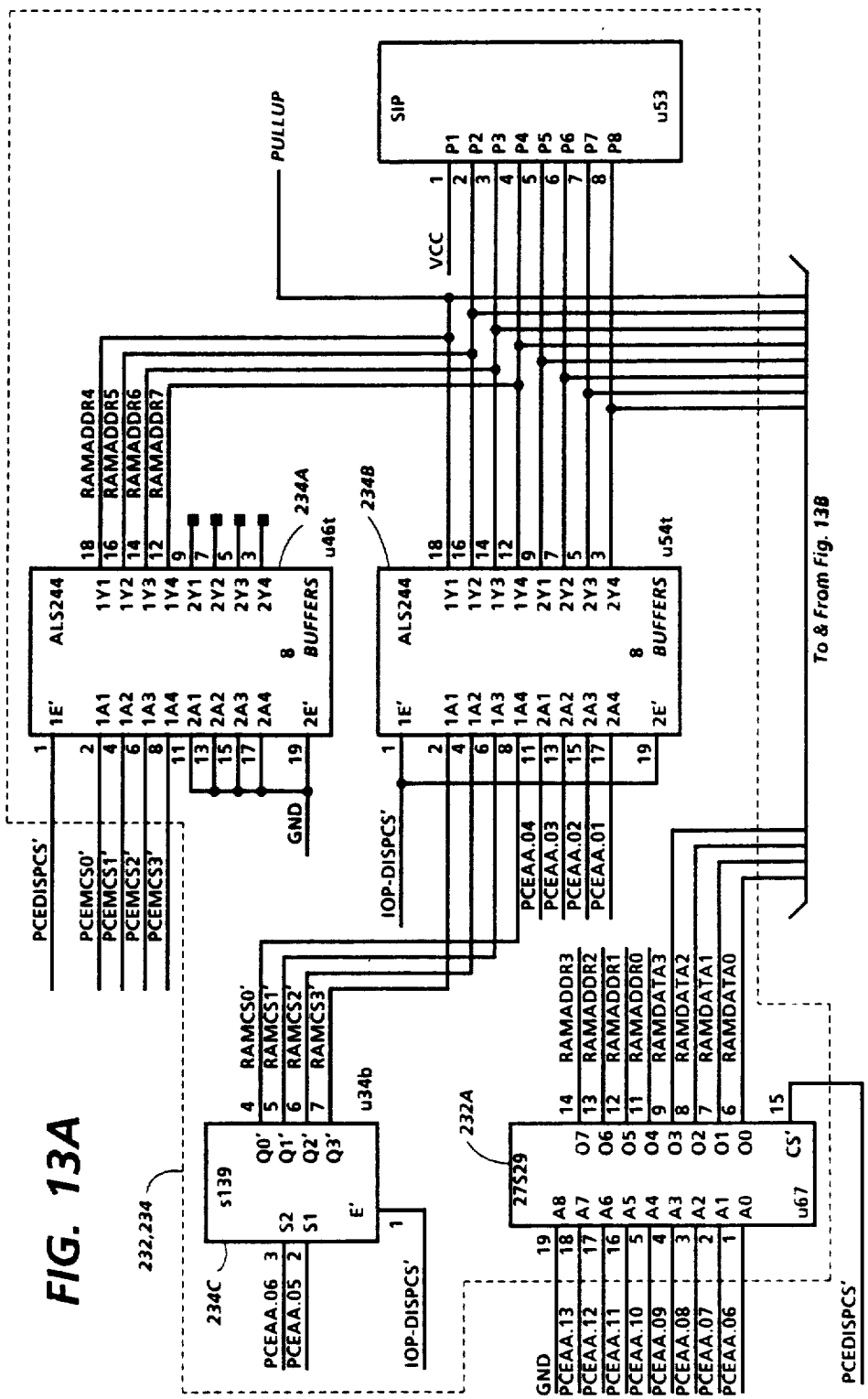
Figure 13B:
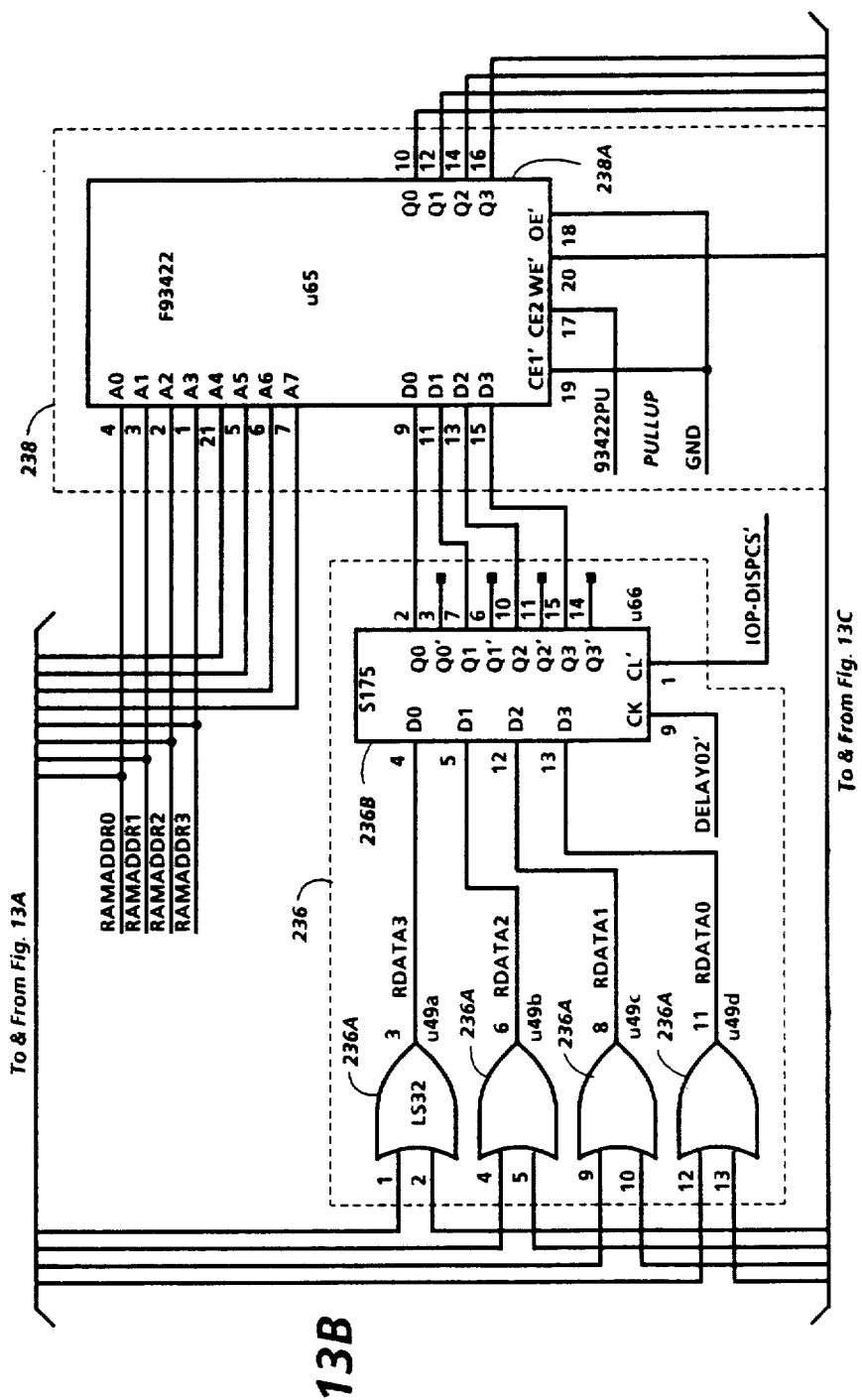

FIGS. 13A, 13B, and 13C show a circuit implementing the functional blocks of FIG. 12 according to the invention. As shown, file map 232 and address MUX 234 share a component, PROM 232a, which serves primarily to translate an eight bit display memory address from PCE CPU 210 into a four bit register file address and a dirty bit on one of four data lines. This translation can be understood more clearly from FIG. 14, showing part of the contents of PROM 232a and the relationship between the addresses and the display memory locations.

A standard IBM PC provides either monochrome or color/graphics display, and uses memory locations B0000-B3FFFh (h meaning the preceding numbers are hexadecimal) as its monochrome display buffer and B8000-BBFFFh as its color/graphics bitmap memory. The emulator of the present invention may provide optionally monochrome or color display, and its display memory potentially includes memory locations B0000-BFFFFh, although not all of this memory is necessary to emulate the standard PC. The 16 bits for the four hex digits other than B are therefore sufficient to determine the location of a byte within the emulating processor's display memory. Only eight address bits are provided to PROM 232a, however, with the six lower-order bits being omitted and the two higher-order bits being handled separately to select one of four display memory buffers, as described below.

As can be seen from FIG. 14, each eight bit address provided to PROM 232a corresponds to a 32 character block, within which the omitted lower-order bits indicating a character. If any of those 32 locations is updated, the corresponding dirty bit will have a value of one in the four bits D3-0 at the output of PROM 232a, and each dirty bit corresponds to five of the 32 character blocks or two lines of the display.

PROM 232a also serves as part of address MUX 234 because the values at its outputs D7-4 provide the lower four bits RAMADDR3-0 of a register file address. Since there are four dirty bit locations at each register file address in register file 238, and each dirty bit corresponds to two lines of the display, each four bit register file address corresponds to eight lines of the display, as shown in FIG. 14. These four bits are provided under control of a signal from PCE CPU 210, PCEDISPCS', which also controls buffer 234a, which provides the remaining four bits RAMADDR7-4 of the register file address as discussed below. PCEDISPCS' therefore causes an eight bit address RAMADDR7-0 to be provided to register file 238.

Buffer 234a provides RAMADDR7-4 based on PCEMCS3'-0', only one of which is on at a time. PCEMCS3'-0' are signals from PCE CPU 210 derived from the higher order bits A19-14 of a display memory address. PCE CPU 210, during boot, loads a special routine which is part of the implementation of the invention. This routine is executed so that, each time PCE CPU 210 writes to its display memory, one of PCEMCS3'-0' goes on to indicate which one of the four available banks of display memory is being accessed and, correspondingly, which of four banks of registers in register file 238 is addressed the MCS2 bank being for monochrome display, the MCS0 bank being for color or graphics display, and the MCS1 and MCS3 banks being unused in emulating the standard PC. Each bank contains 16 registers, each register storing four dirty bits. RAMADDR3-0 indicate which register within a selected bank is addressed.

Address MUX 234 also includes buffer 234b and 2-to-4 bit decoder 234c which are selected by the signal IOP-DISPCS' as the source of the register file address when IOP 160 is reading register file 238. IOP 160 provides six address bits, the higher order pair of which are decoded to indicate which bank is addressed, the lower order bits indicating the register within that bank. Thus the function of address MUX is to select between the address provided by buffer 234b and decoder 234c, on the one hand, and the address provided by PROM 234a and buffer 234a on the other.

Data MUX 236 performs a different type of multiplexing, in which a respective one of OR gates 236a performs a logical OR operation on each of the data outputs of PROM 232a and the corresponding data output of register file 238. In effect, each previously set dirty bit will remain dirty, while new dirty bits will be added, until IOP 160 reads the register file 138. The results of the OR operations are stored in a bank of flip-flops 236b by the signal DELAYQ2', and flip-floops 236b are cleared by IOP-DISPCS' when IOP 160 reads register file 238. The Q outputs of flip-flops 236b are applied as data input to register files 238.

Register file 238 includes RAM 238a and circuitry for controlling its writing and reading. As discussed above, RAM 238a receives an address on lines RAMADDR7-0 and dirty bits on lines RAMDIN3-0 from flip-flops 236b. Each line of its output goes to one of the OR gates 236a for multiplexing with new dirty bits. Gates 238b-e control the writing of RAM 238a in response to control signals from IOP 160 and PCE CPU 210. OR gate 238b provides a high output only when PCE CPU 210b signals that it has ended either enabling PROM 232a or writing to system memory 126. OR gate 238c, on the other hand, provides a low signal periodically based on DELAYQ3', timed to occur after DELAYQ2'. AND gate 238d provides a high signal only when OR gate 238b provides a high and IOP 160 signal that it is no loner addressing RAM 238a. Therefore, OR gate 238e permits RAM 238a to be written periodically, if either IOP 160 or PCE CPU 210 has finished providing an address to RAM 238. In other words, RAM 238a will be written with dirty bits from flip-flops 236b when addressed by PCE CPU 210 and with zeroes from cleared flip-flops 236b when addressed by IOP 160.

Master dirty bit store 240 includes flip-flop 240a which is clocked to store a high value by a high signal from OR gate 238b, indicating PCE CPU 210 has completed the writing of dirty bits to RAM 238a. Flip-flop 240a is reset to a low value when IOP 210 completes the reading of RAM 238a.

Since IOP 160 rewrites each addressed location with zeroes immediately after reading it, latch element 242a in latch 242 holds the dirty bits for retrieval by IOP 160. Timing signal DELAYQ2 ensures that it will receive and store the dirty bits before they are replaced by zeroes upon the occurrence of DELAYQ3', and it also stoes the master dirty bit. Latch element 242a provides its output in response to a signal from OR gate 242b indicating that IOP 160 has completed a read operation during which it addressed RAM 238a.

Figure 15:
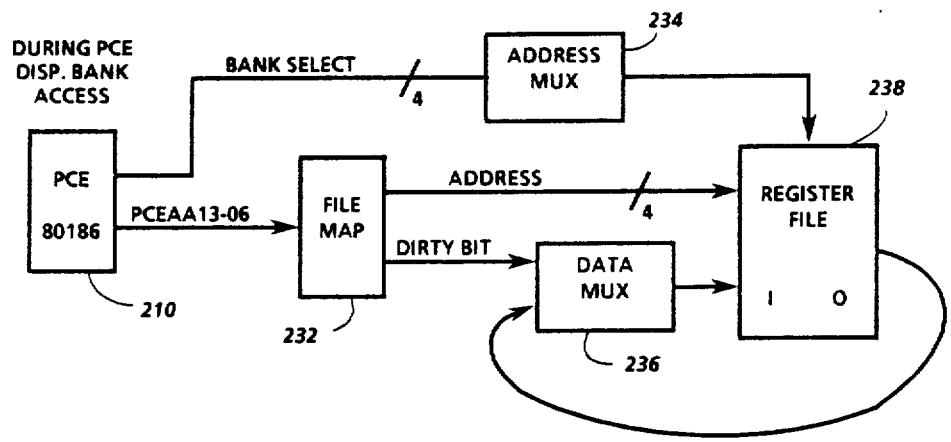
FIG. 15 is an information flow diagram showing the monitoring operation of the display trapper of FIG. 12.
Figure 16:
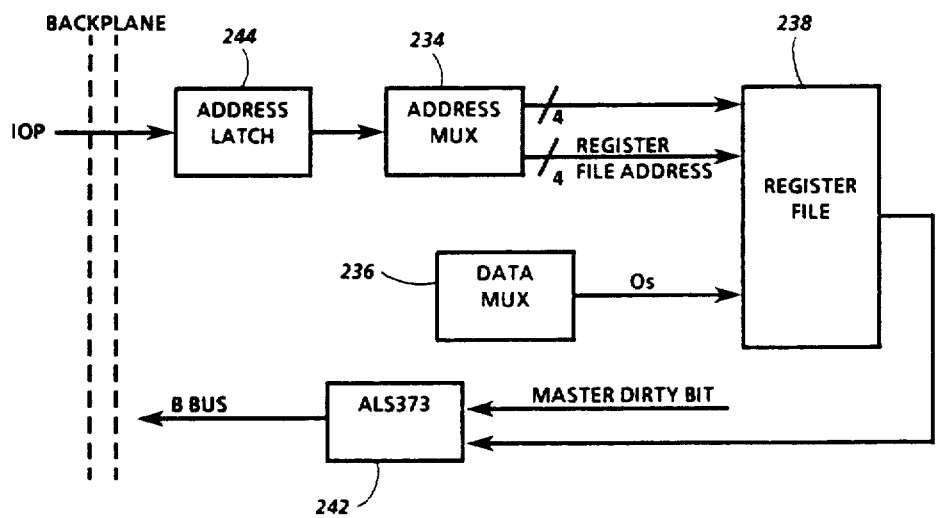
FIG. 16 is an information flow diagram showing the operation of reading the contents of the display trapper of FIG. 12.

Operation of display trapper 230 can be more fully understood from FIGS. 15 and 16, each of which shows the information flow during a respective operation. FIG. 15 shows the writing of dirty bits to RAM 238a, while FIG. 16 shows the reading of dirty bits by IOP 160.

The operation in FIG. 15 begins with the receiving of a register bank selection signal by address MUX 234, which, in turn addresses the selected bank. The register bank select signal is derived from a signal sent by PCE CPU 210 in accessing its display banks in system memory 126. PCE CPU 210 also sends an address to its display banks, bits PCE AA 13–06 of which are received by file map 232, resulting in an address and a dirty bit as described above in relation to FIG. 14. The address is applied to register file 238 to select the register to be written. The dirty bits in that register are read out and applied to data MUX 236, together with the dirty bit from file map 232. The data MUX 236 performs a logical OR, latching the result until it may be written into register file 238, completing the operation.

The operation in FIG. 16 begins when IOP 160 provides a display trapper register address on IOP bus 140. This address is received and held in address latch 244 on the PCE option board 200. Address MUX 234 receives this address, decoding it to obtain a register bank select signal and a register select address, which are applied to register file 238. The data output from the selected register in register file 238 is then held in latch 242, which applies them to IOP bus 140 to be received by IOP 160.

Meanwhile, data MUX 236 applies output zeroes which are written into the selected register, and master dirty bit store 240 is also reset.

Based on the dirty bits provided by display trapper 230, IOP 160 provides signals to Mesa CPU 112 indicating the display area to be updated. The operations of IOP 160 are described in greater detail below.

B. I/O Trapper

I/O trapper 250 monitors I/O requests by PCE CPU 210 and stores its I/O control signals for subsequent retrieval by IOP 160.

Figure 17:
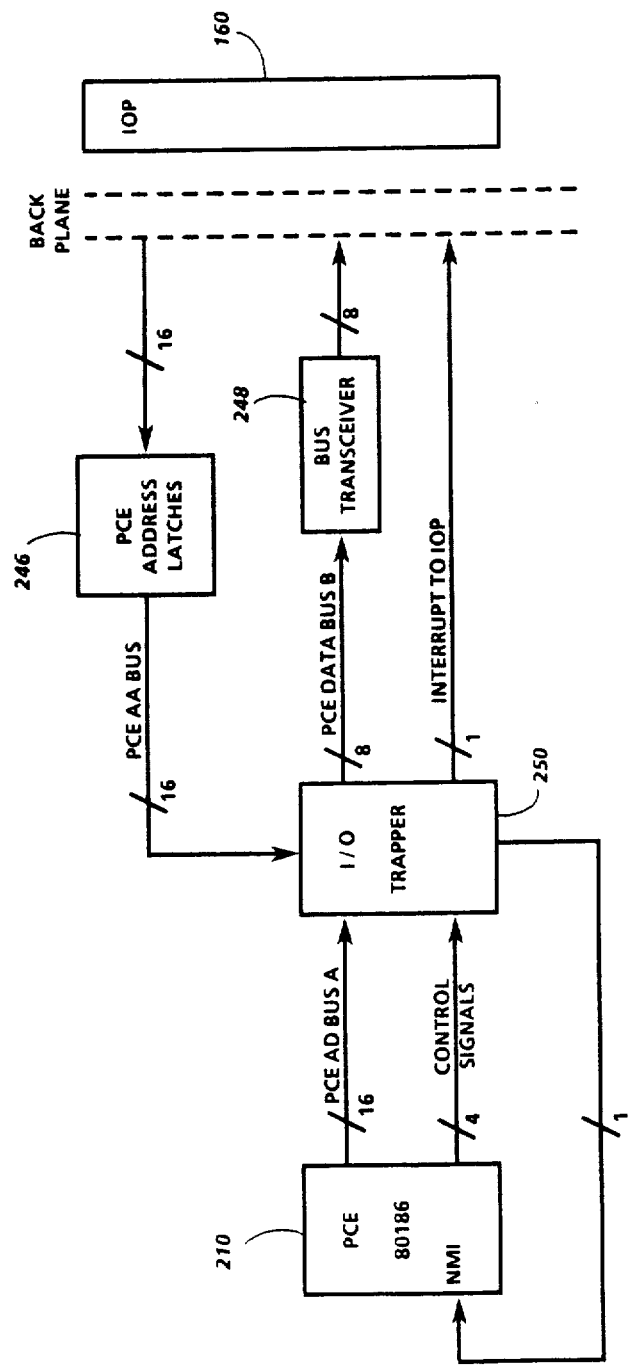
FIG. 17 is a block diagram showing the I/O trapper of FIG. 11 in relation to other components.

FIG. 17 shows the flow of signals to and from I/O trapper 250. Upon receiving signals from PCE CPU 210 indicating an I/O read or write operation, I/O trapper 250 receives and stores address, data and control signals from PCE CPU 210. If a read operation, I/O trapper 250 then provides a non-maskable interrupt (NMI) to PCE CPU 210, the servicing of which is discussed below in relation to IOP operations. I/O trapper 250 also sends an interrupt to IOP 160, via IOP bus 140. IOP 160 will service this as the lowest priority interrupt, as discussed above, sending addresses to PCE address latches 246 which cause I/O trapper 250 to provide the stored address, data and control signals to bus transceiver 248 for transmission on IOP bus 140. In this manner, IOP 160 obtains the information needed to emulate the appropriate I/O device.

FIGS. 18A–18E show the five trapping registers of I/O trapper 250—address registers 252 and 254, status register 256 and data registers 266 and 268.

Figure 19:
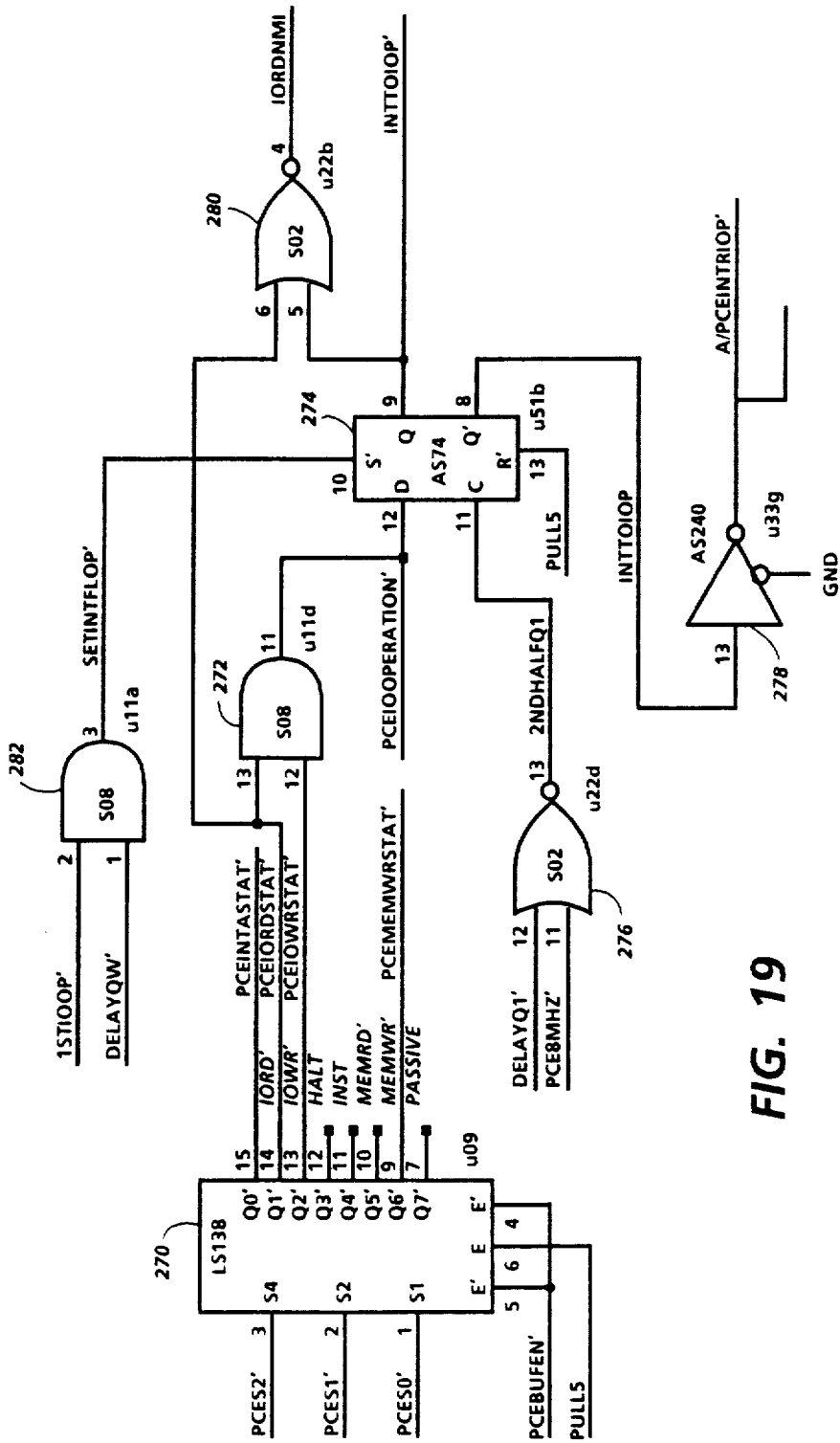
FIG. 19 shows interrupt generating circuitry in the I/O trapper of FIG. 17.
Figure 20:
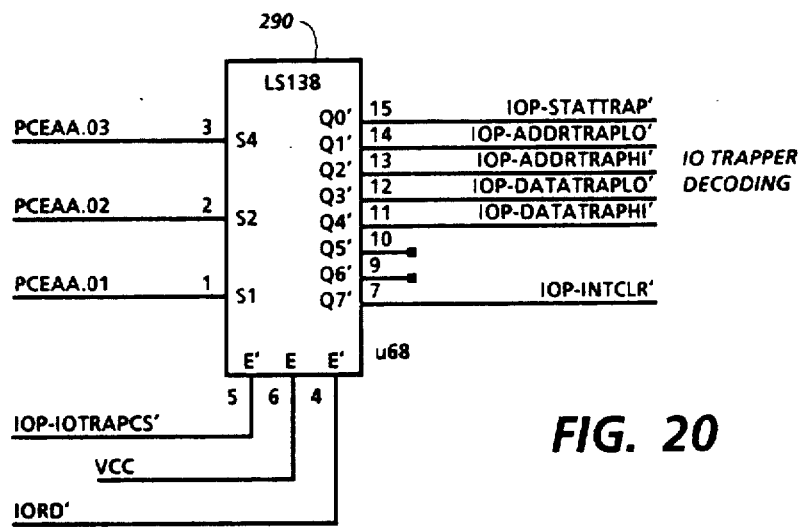
FIG. 20 shows a decoder in the I/O trapper of FIG. 17.

FIGS. 19 and 20 show other circuits in I/O trapper 250 which provide control signals for IOP 160, PCE CPU 210 and the trapping registers.

Figure 18A:
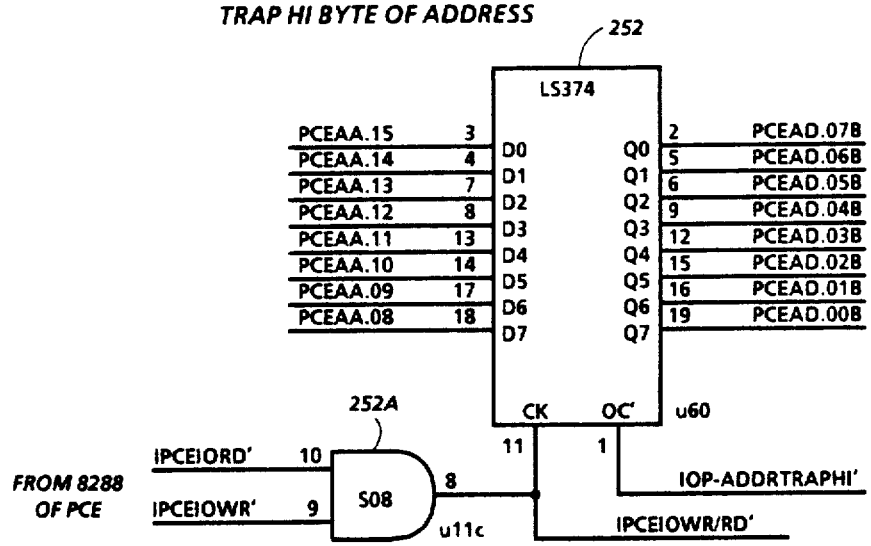
FIGS. 18A-18E show, respectively, the high byte address register, the low byte address register, the status register, the low byte data register and the high byte data register of the I/O trapper of FIG. 17.
Figure 18B:
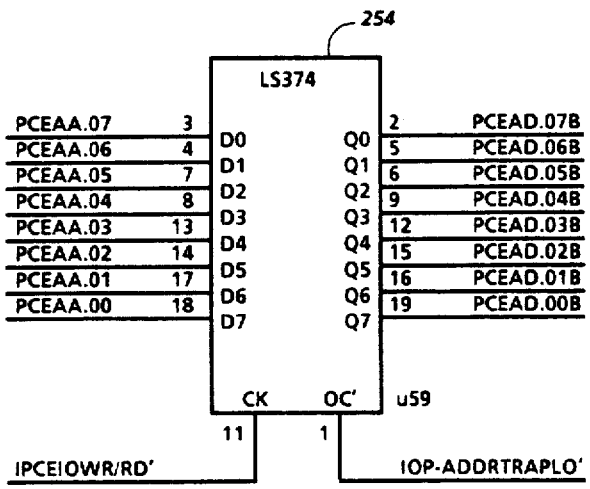

FIGS. 18A and 18B show address registers 252 and 254, respectively. As shown, register 252 stores the high byte of an address, while registers 254 stores the low byte of an address on the PCE address bus. Registers 252 and 254 both store the address at their inputs in response to a clocking signal which is provided by AND gate 252a at the end of a read or write signal from PCE CPU 210.

Figure 18C:
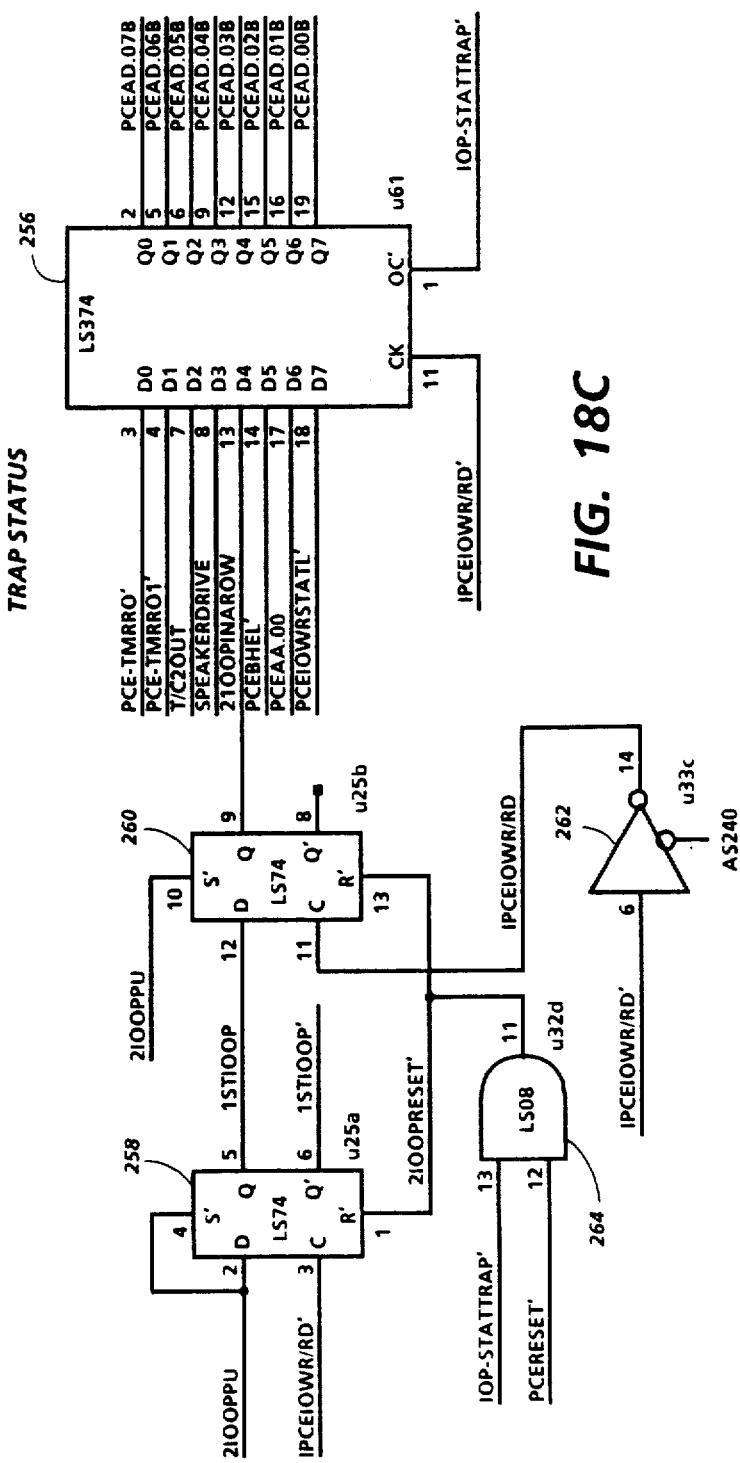

FIG. 18C shows status register 256, which stores a number of status signals relating to the operation of PCE CPU 210. Of these signals, one is of particular interest to I/O operations, 21OOPINAROW, wich, when two I/O bus cycles have occurred in a row, has a value of 1. Two consecutive I/O bus cycles occur only when PCE CPU 210 executes a wordwide I/O operation to an odd address, and the signal 21OOPINAROW indicates that the high byte and low byte are reversed. Flip-flops 258 and 260 serve as a counter of I/O bus cycles, with flip-flop 258 clocked by the output high signal from AND gate 252a, which also clock status register 256 and address registers 252 and 254, discussed above. Flip-flop 260, which receives the high signal from flip-flop 258 after it has been clocked, is then clocked when the inverted signal from AND gate 252a goes high, which will occur when the next I/O bus cycle begins. If the subsequent bus cycle within the same instruction is not an I/O bus cycle, the signal from IOP 160 which reads the status register 256 after that instruction is completed will also reset flip-flops 258 and 260. Therefore, flip-flop 260 will only provide a high output after two consecutive I/O bus cycles within a single instruction.

Figure 18D:
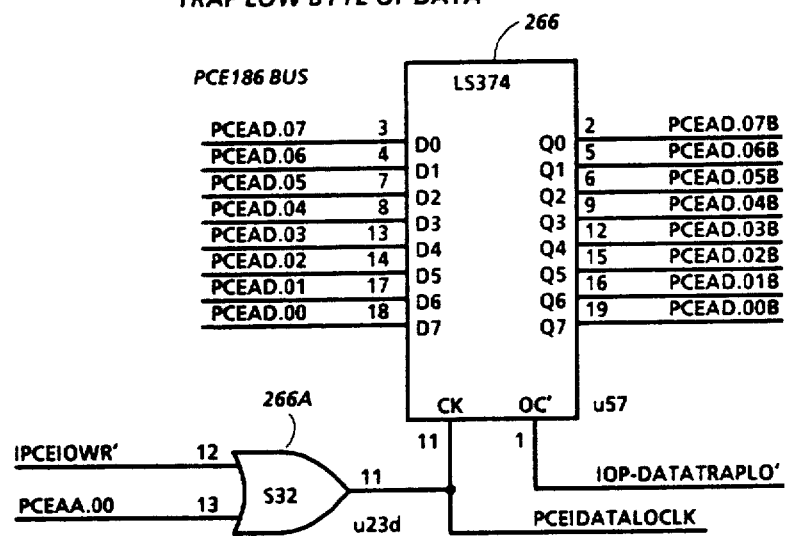
Figure 18E:
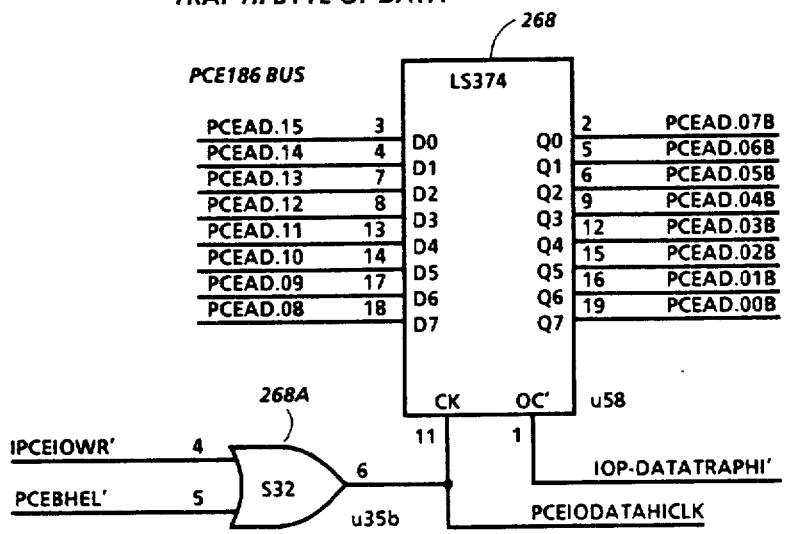

FIGS. 18D and 18E show data registers 266 and 268, which are used only during I/O write operations. Each is clocked by a signal which goes high only at the end of a write operation by PCE CPU 210 onto the respective part of the data bus, as determined by OR gates 266a and 268a. The signals PCEAA.00' and PCEBHEL', when low, indicate selection of the low and high data bytes, respectively.

FIG. 19 shows circuitry in I/O trapper 250 which generates the interrupt signals, both the NMI to PCE CPU 210 and the PCE interrupt to IOP 160. Decoder 270 receives three signals from PCE CPU 210 which indicate the type of operation it is performing. Decoder 270 provides two signals indicating whether I/O read and I/O write, respectively, are being performed, and AND gate 272 provides a high signal only when neither is being performed. The signal from AND gate 272 is clocked into flip-flop 274 when the signal from NOR gate 276 goes high during an appropriate part of an instruction cycle. If the clocked-in signal is low, the Q' output of flip-flop 274, inverted by inverter 278, will go high, providing an interrupt to IOP 160. If an I/O read is being performed, NOR gate 280 will also provide the NMI to PCE CPU 210. After I/O trapper status register 256 has been read by IOP 160, flip-flop 274 will be set by a signal from AND gate 282, so that both interrupt signals will end.

FIG. 20 shows decoder 290 which receives three bits of an address from IOP 160 via latches 246 and which also receives control signals indicating that IOP 160 is reading the I/O trapping registers. In response to three bits, decoder 290 provides one of several output signals indicating which of the registers is to be read. As can be seen from FIGS. 18A-18E, all of the registers are read over the same lines, so that only one register can be read at a time.

Figure 21:
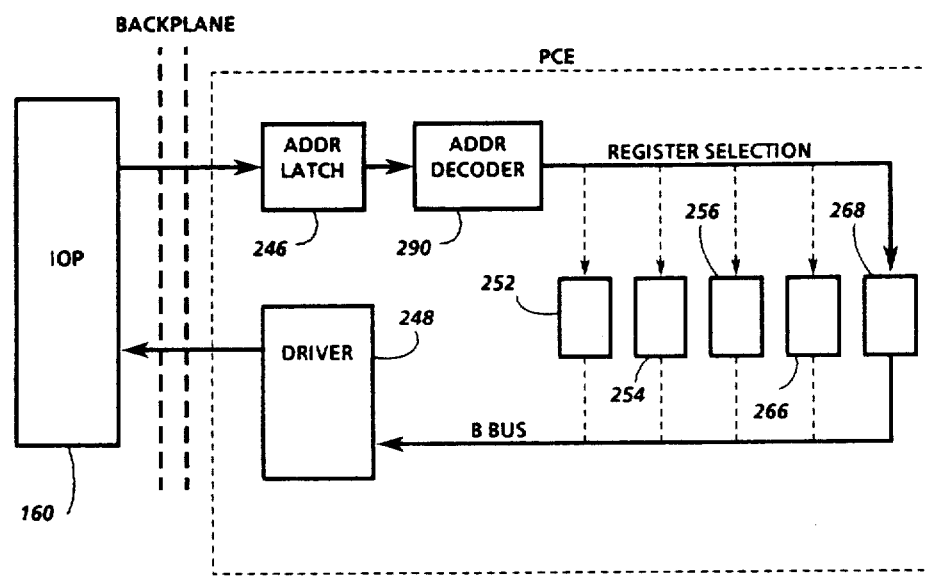
FIG. 21 is an information flow diagram showing the operation of reading the contents of the I/O trapper of FIG. 17.

FIG. 21 shows how IOP 160 performs an I/O trapping register read operation. IOP 160 will have received a PCE interrupt via master interrupt controller 166b, and will have received control of IOP bus 140 from arbiter/mode control 170, also acting in response to the PCE interrupt. IOP 160 then sends an address to address latch 246, which is decoded by decoder 290. The decoded addres selects one of the trapping registers 252, 254, 256, 266 or 268, whose contents are sent to transceiver 248 for transmission to IOP 160.

Although display trapper 230 and I/O trapper 250 provide necessary information to IOP 160 to permit emulation of the environment of PCE CPU 210 and of the user interface of a PC, a number of other components are on PCE option board 200, including some dedicated I/O devices 300.

C. Additional PCE Circuits

Figure 22A:
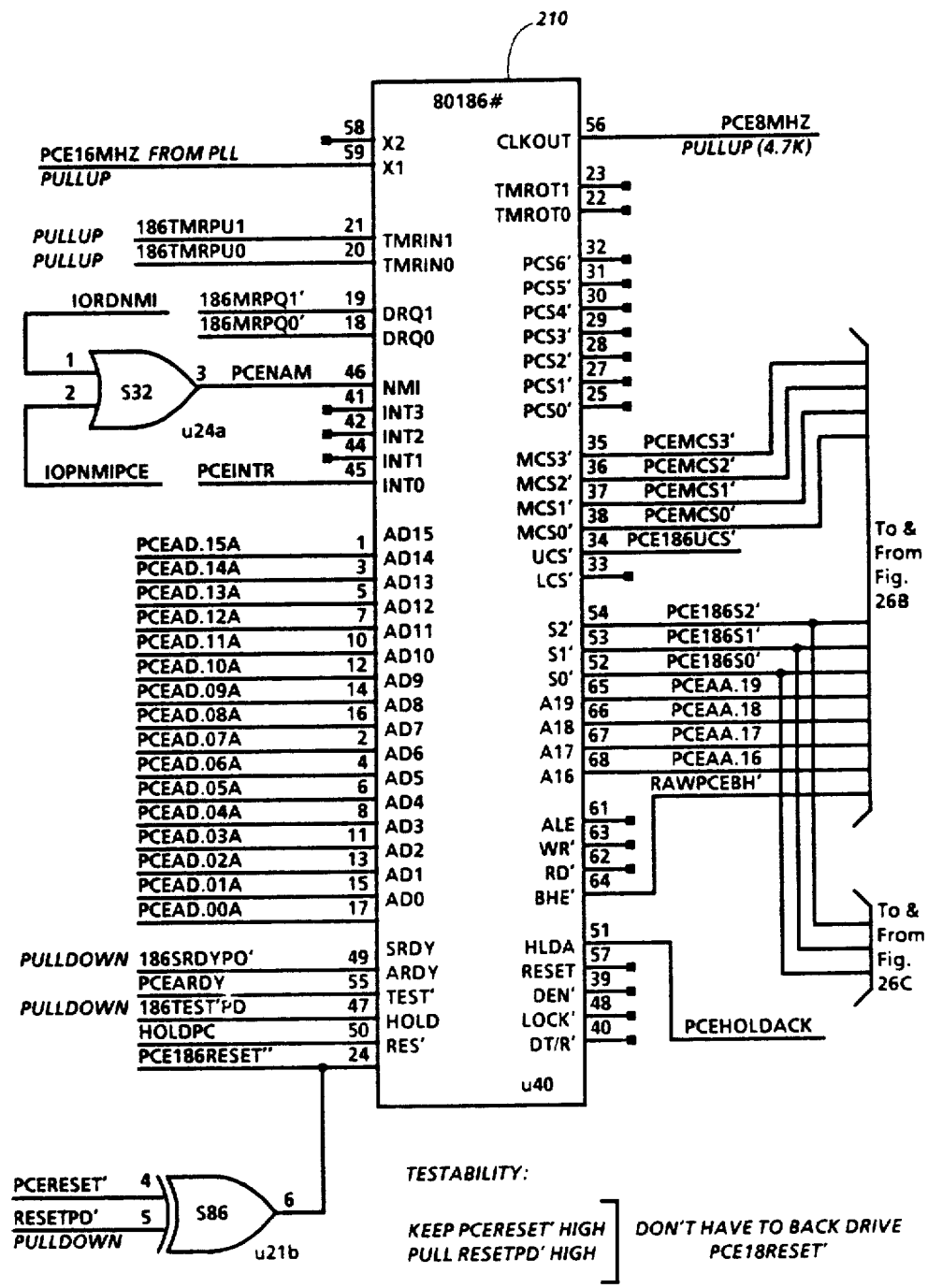
FIGS. 22A, 22B, and 22C are a detailed circuit diagram showing the PCE CPU of FIG. 11.
Figure 22B:
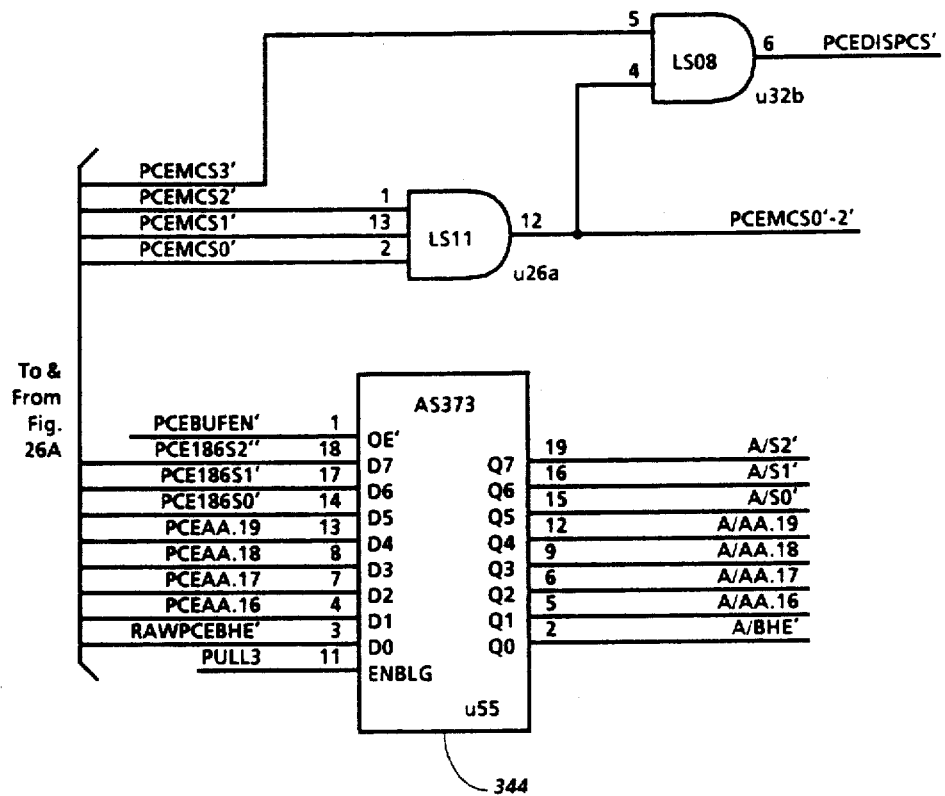
Figure 22C:
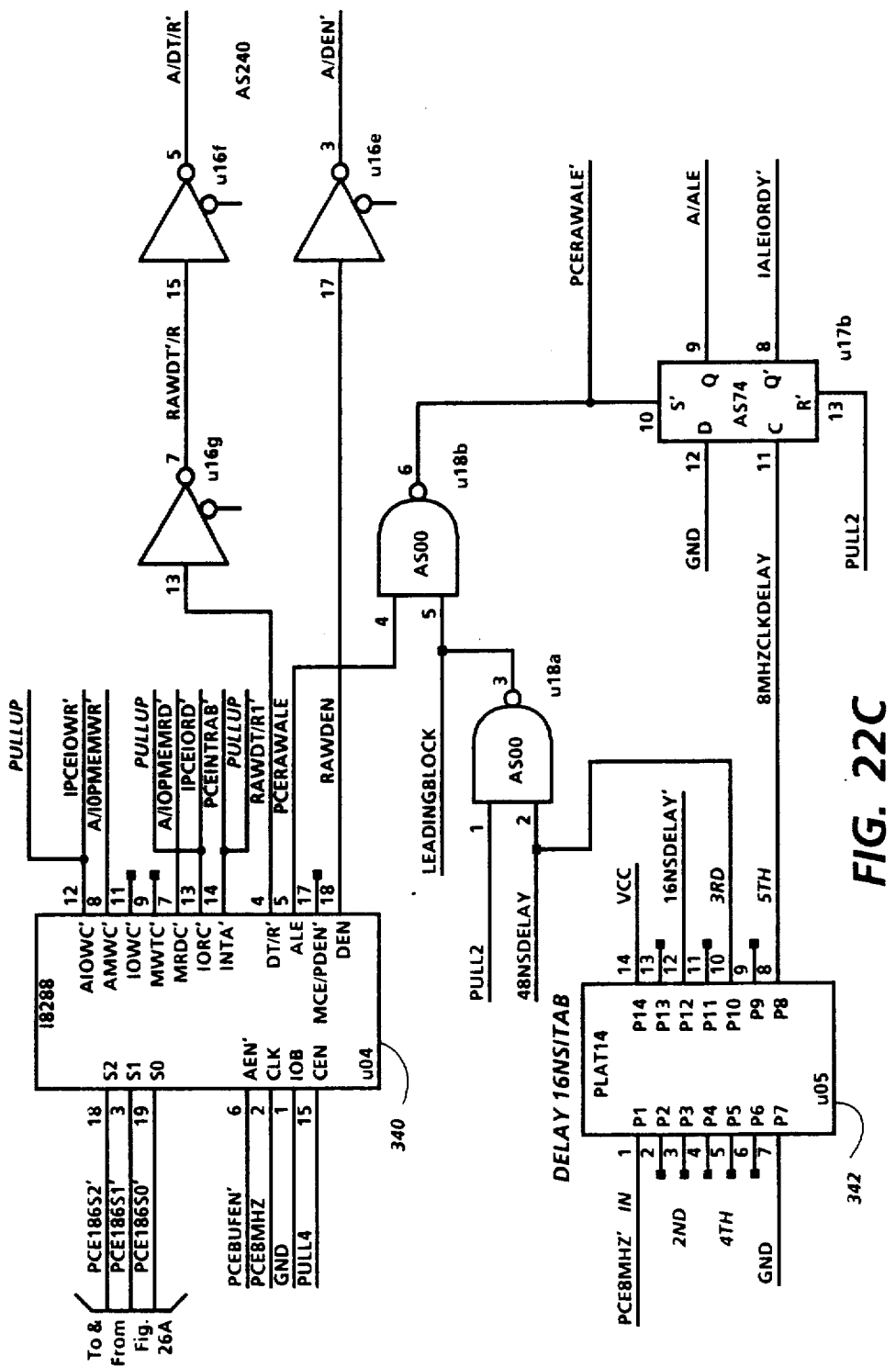

Up to now we have focused on the PCE board circuitry which relates most directly to emulation of the environment of PCE CPU 210, but a number of other components are included on PCE option board 200. FIGS. 22A, 22B, and 22C show PCE CPU 210 itself, with signal names at its input and output lines and with some of its supporting circuitry.

FIGS. 22A, 22B and 22C shows that some of the output signals from PCE CPU 210 go to bus controller 340, an Intel 8288 chip. Bus controller 340 decodes lines PCE186ZS0'-S2' and generates command and control signals at appropriate times, according to Table I:

TABLE 1

| CPU Lines | | | |
|---|---|---|---|
| S2' | S1' | S0' | 8288 Command |
| 0 | 0 | 0 | Interrupt Acknowledge |
| 0 | 0 | 1 | Read I/O |
| 0 | 1 | 0 | Write I/O |
| 0 | 1 | 1 | Halt |
| 1 | 0 | 0 | Instruction Fetch |
| 1 | 0 | 1 | Read Data from Memory |
| 1 | 1 | 0 | Write Data to Memory |
| 1 | 1 | 1 | Passive (no bus cycle) |

Some of the output signals from bus controller 340 appear in the schematic drawings discussed above. In general, bus controller 340 acts by providing signals on the control lines of IOP bus 140 and by enabling or disabling the components which may transmit or receive on the bus. The timing of the signals from bus controller 340 is controlled in part by delay chip 342. Signals from delay chip 342 control logic which times the application of an address latch enable signal.

FIGS. 22A, 22B, and 22C also shows buffer 344 which holds a number of signals from PCE CPU 210. These signals are latched to other buffers or to the IOP bus 140.

IV. Emulated Environment

The emulation of the environment of PCE CPU 210 requires the emulation of several distinct components which would be available to the CPU of an IBM PC, including memory and I/O devices. In most instances, host system 16 has an analogous component to the component being emulated, but the analogous component operates differently than the emulated component, so that PCE CPU 210 cannot simply treat the analogous component as if it were the emulated component.

A related problem in emulating the environment is that host system 16 cannot provide the responses of some of the emulated devices as quickly as the devices themselves could. In the particular architecture of the Xerox 6085, as described above, emulation by IOP 140 may not in fact be slower than the actual devices would be, but PCE CPU 210 will be stopped by IOP 140 during I/O device emulation, so that the responses are provided more slowly than by the actual devices. Therefore, PCE CPU 210 must be controlled so that it will continue to execute an instruction sequence properly even though some emulated devices in its environment respond more slowly than actual devices would respond.

In addition, during emulation, host system 16 may also emulate the user interface of the target system, in this case an IBM PC. This requires that host system 16 be capable of deriving the information necessary to emulate the user interface from PCE CPU 210.

In order to solve these problems, emulation according to the present invention may be implemented by combining two distinct techniques. The first technique is to emulate the memory of PCE CPU 210 in such a manner that it can execute memory read and write operations in the same number of instruction cycles as the IBM PC; execution of instructions requiring only memory read and write will proceed much as if PCE CPU 210 were in an IBM PC. The second technique is to emulate I/O devices with a separate processor, IOP 160, which controls PCE CPU 210 so that it continues to execute an instruction sequence properly, even though some of the instructions result in device emulation which responds more slowly than the corresponding actual devices in an IBM PC. If appropriate information is provided to host system 16 to enable it to emulate both the environment and the user interface of the target IBM PC, the two techiques can be combined to solve all of the problems set forth above.

A. Memory Emulation

A number of important considerations apply to memory emulation. Unless PCE CPU 210 interacts with memory much as it would in an IBM PC, emulation will be difficult, since most IBM PC instructions executed will involve at least one memory access, either to read or to write. At the same time, however, some information stored in memory by PCE CPU 210 must be available to host system 16 to permit it to emulate the user interface, especially the display. Furthermore, the processor emulating I/O devices, IOP 160, must control PCE CPU 210, and this may advantageously be done in part by accessing PCE memory. Finally, if PCE CPU 210 should fail or "crash" during execution, for whatever reason, host system 16 should continue to operate normally.

Memory emulation according to the present invention may be implemented in a manner which addresses all of the above considerations. The architecture of system 100 shown in FIG. 8 illustrates such an implementation. PCE CPU 210, in PCE option 200, may address memory directly over IOP bus 140, and its memory requests may be handled in much the same manner as those requests would be handled by the memory in an IBM PC. Mesa CPU 112 may obtain information necessary to emulate the user interface, especially the display, by accessing the portion of memory allocated to PCE CPU 210. Similarly, when PCE CPU 210 does not have control of IOP bus 140, IOP 160 may exercise some control over PCE CPU 210 by accessing its space in memory. Means may be provided for protecting host system 16 from failure of PCE CPU 210.

Figure 23:
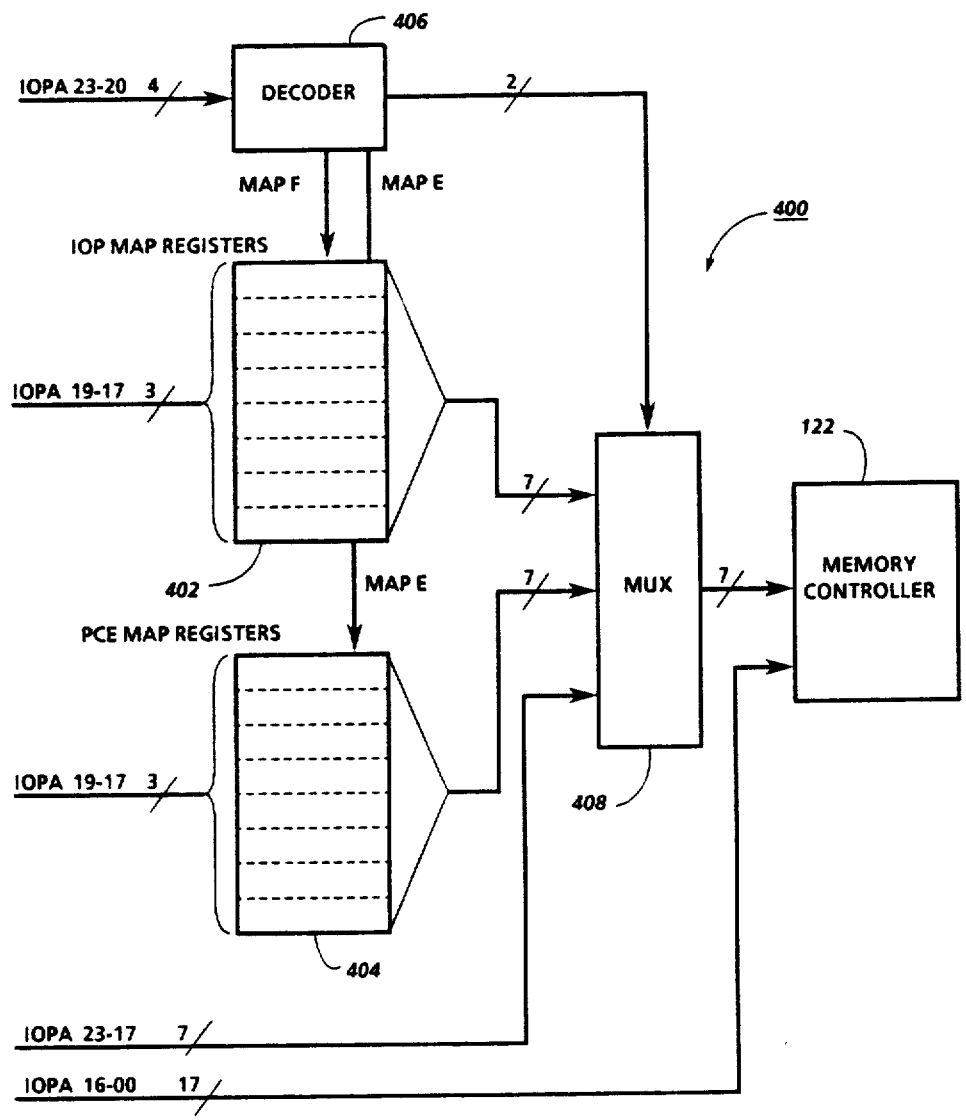
FIG. 23 is a block diagram of the memory mapper of FIG. 11.

As discussed above, the architecture of system 100 in FIG. 8 is that of a conventional Xerox 6085 workstation, but one feature of that architecture is particularly useful to protect host system 16 from failure of PCE CPU 210. FIG. 23 shows mapper 400 which permits the mapping of the PCE memory space in such a manner that host system 16 will be unaffected by such a failure.

Mapper 400 includes map register files 402 and 404 which store values necessary for mapping memory addresses. IOP map registers 402 store values necessary for mapping memory addresses from IOP 140, while PCE map registers 404 store values necessary for mapping memory addresses from PCE CPU 210. Map register files 402 and 404 are selectable by the signals MapF and MapE, respectively, from address decoder 406, as shown. Selection of the register within the selected file will be made by the three bits IOPA19-17 from IOP bus 140. Decoder 406 also provides a signal to multiplexer (MUX) 408 which determines which of the signals at its input is provided at its output to memory controller 122.

Decoder 406 receives four bits, IOPA23-20 which control its operation. If those four bits take the hexadecimal values E or F (1110b, 1111b), decoder 406 provides the appropriate signal MapE or MapF to register files 402 and 404 and provides a corresponding signal to MUX 408. The result is that the contents of the register selected by IOPA19-17 are provided to MUX 408 and thence to memory controller 122. But if the four bits IOPA23-20 take any value other than E or F, decoder 406 provides a signal to MUX 408, so that it provides bits IOPA23-17 from IOP bus 140 to memory controller 122. IOPA16-00 are provided directly to memory controller 122 to complete the address.

The values on lines IOPA23-20 are provided by some of the circuitry discussed in relation to FIGS. 28I 28K of copending, coassigned U.S. patent application Ser. No. 856,526 ("the parent application"), incorporated herein by reference. All four lines are pulled up by appropriate circuitry associated with IOP 160, but, as shown in FIG. 28I of the parent application, line IOPA20, corresponding to A/AA.20, is pulled down to a low signal by a gated inverter when the signal PCE-BUFEN' goes low. As shown in FIG. 28K of the parent application, PCEBUFEN' will go low when PCE CPU 210 stops acknowledging a hold and reset has been released. In other words, after reset has been released, PCEBUFEN' will go low whenever PCE CPU 210 is released from a hold and takes over IOP bus 140.

The contents of the registers in map register files 402 and 404 will determine the actual mapping which is performed. These registers may be addressable as I/O devices within the IOP address space, so that IOP 160 may load them, but PCE CPU 210 cannot access them. As IOP 160 is loading the registers, it can also clear the corresponding actual memory locations by addressing and zeroing the contents stored at all values of IOPA1-6–00.

The map register files 402 and 404 may each contain eight registers, to permit each processor to address eight memory blocks of 128 KBytes each. Due to a feature of the IBM PC, however, PCE CPU 210 may need only six of those blocks. In one targeted IBM PC, 384 KBytes of specialized memory for system specific data beginning at A0000h contain only the following: B0000-B3FFFh contain the monochrome display memory; B8000-BBFFFh contain the color/graphics display memory; C8000-CBFFFh contain the fixed disk control memory; F0000-FDFFFh contain the ROM BASIC, not necessary for emulation; and FE00-0-FFFFFh contain the ROMBIOS. The remainder of memory for general purpose applications is addressable in five blocks of 128 KBytes each from 00000-9FFFFh. Therefore, the 384 KBytes of specialized memory can be mapped into a single 128 KByte block. On the other hand, if it is desired to run software which makes full use of all eight blocks of 128 KBytes of addressable memory, sharing of blocks is undesirable, because the blocks sharing memory space will be in conflict.

One mapping which is especially convenient takes advantage of the omission of ROM BASIC at F0000-FDFFFh in the allocation of specialized memory set forth above. If bits 19-17 of the addresses of the remaining contents of the specialized memory are ignored, there will nonetheless be no conflict between those contents, i.e. each location allocated to store data will have only one item of data in it. Therefore, the same value for address bits 23-17 can be stored in each register which corresponds to one of those three 128 KByte blocks without conflict. In effect, all three 128 KByte blocks are stored in one 128 KByte block, saving 256 KBytes.

The mapping of memory in the manner described above protects host system 16 from failure by PCE CPU 210, because failure will only affect the part of memory allocated to PCE CPU 210. Furthermore, PCE CPU 210 will be able to treat system memory 126 as if it were its own memory, just as the CPU of an IBM PC would. Therefore, mapping is an effective technique for memory emulation.

B. I/O device emulation—IOP controlled

Emulation of most of the devices which provide the process environment differs from emulation of memory in that operation of PCE CPU 210 stops during emulation. While PCE CPU 210 is stopped, means within host system 16 performs the sequence of steps discussed above in relation to FIG. 5, emulating the appropriate I/O device. Then, when emulation is completed, PCE CPU 210 is permitted to resume operation.

Figure 24:
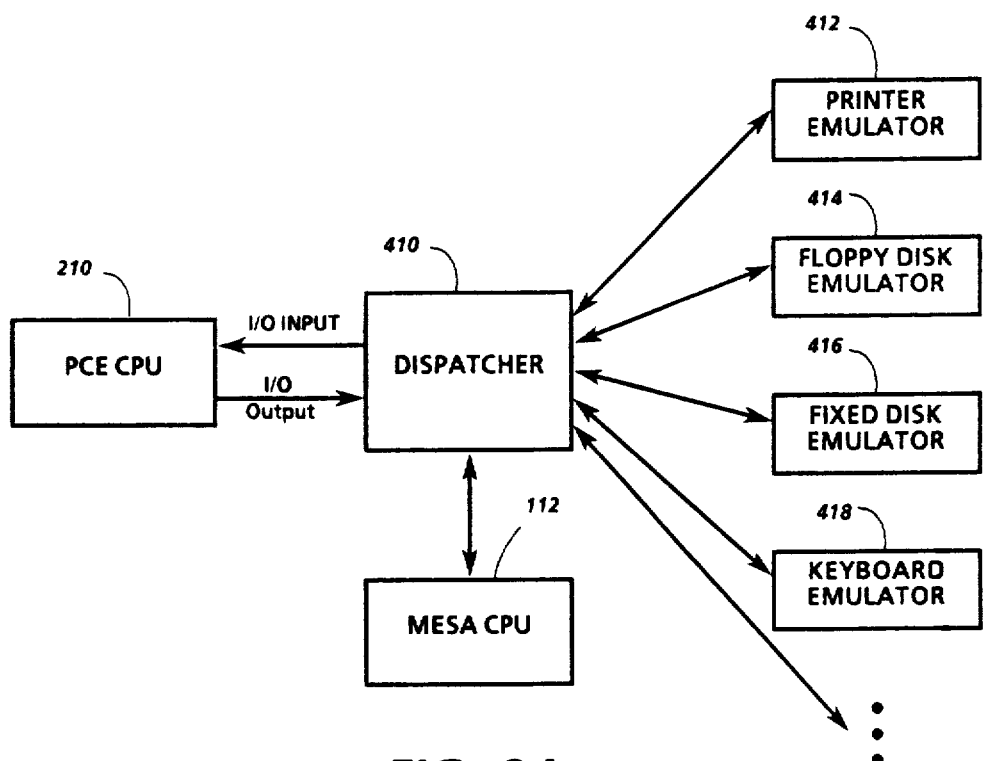
FIG. 24 is a block diagram showing the relationships between other components and the Dispatcher run on the IOP of FIG. 8 and which controls I/O device emulation.
Figure 25:
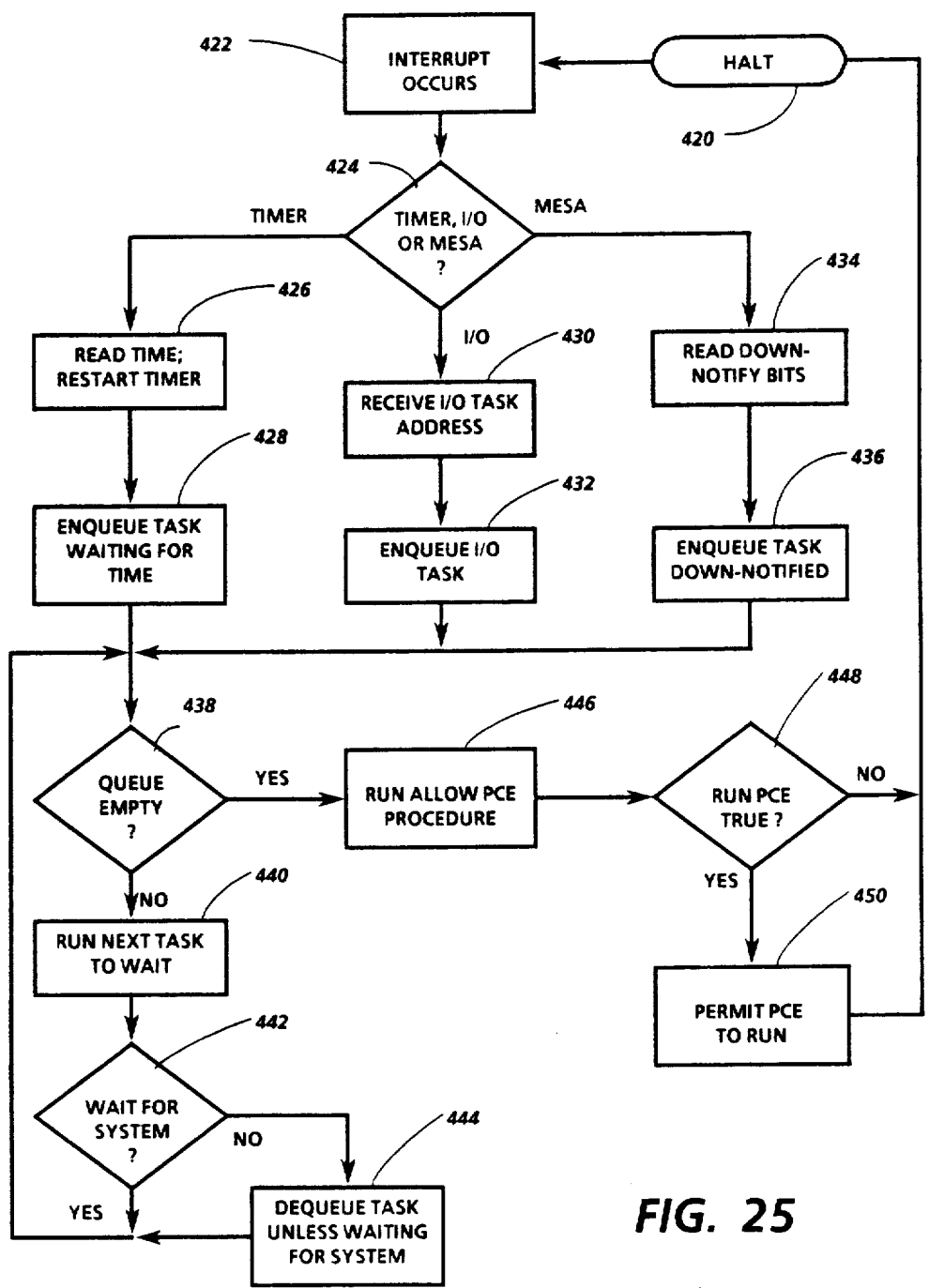
FIG. 25 is a flowchart showing relevant features of the operating system of the IOP of FIG. 8.

The means for emulating the I/O devices includes IOP 160 as well as Mesa CPU 112. Although both processors participate, IOP 160 manages the emulation, primarily by executing software referred to as Dispatcher. FIG. 24 illustrates the relationships between Dispatcher 410 and other components. Dispatcher 410 handles communication between PCE CPU 210 and the various means which perform each of the specific I/O device emulations, examples of which include printer emulator 412, floppy disk emulator 414, fixed disk emulator 416 and keyboard emulator 418. In addition, Dispatcher 410 communicates with Mesa CPU 112. Dispatcher 410 therefore manages the performance of the steps shown in FIG. 5, with each of the device emulators being called when needed by Dispatcher 410.

1. Dispatcher. Because its task is to provide communication between a number of components, Dispatcher 410 could be implemented in many ways. An implementation which is especially appropriate for the host system architecture described above relies on a specialized operating system for IOP 160. That specialized operating system performs some basic Dispatcher functions, and also supports a multitasking queue which may hold tasks which perform other Dispatcher functions, some device emulator functions and a number of other functions.

a. IOP operating system. The operating system for IOP 160 could similarly be implemented in many ways, but, as noted above, can be a specialized operating system which performs only I/O operations. As a result, this operating system is more powerful than a general operating system which also performs other operations. The specialized operating system is possible because the architecture of host system 16 as shown in FIG. 8 permits true parallel operation, with Mesa CPU 112 performing other operations while IOP 160 performs I/O operations.

The relevant features of the specialized IOP operating system are shown in FIG. 33, which is a partial operating system flowchart. When IOP 160 is powered up, the operating system is automatically booted, and continues to run as long as IOP 160 operates, coming to rest in a halt state, as shown in box 420, during periods of inactivity. When an interrupt occurs, as in box 422, IOP 160 in effect wakes up, and a number of hardware functions are performed in the conventional manner for an Intel 80186 microprocessor. The hardware automatically stores the contents of certain registers and loads an address for servicing the interrupt. This address calls the specialized IOP operating system described above and it begins to execute.

The operating system first tests the type of interrupt, in box 424, with the three relevant types being an interrupt from the onboard timer of the 80186, an interrupt from the master interrupt controller 166b calling for an I/O operation, or an interrupt called a downnotify from the Mesa CPU 112. If the interrupt is from the timer, the IOP 160 reads its timer and restarts it, in box 426; then it adds to its multitasking queue any tasks which were waiting for the timer interrupt, in box 428. Similarly, if the interrupt is an I/O interrupt, IOP 160 receives the address from master interrupt controller 166b, in box 430, and adds the I/O task found at that address to the multitasking queue, in box 432. If the interrupt is from the Mesa CPU 112, IOP 160 reads a number of bytes from system memory 126 containing downnotify bits, in box 434, and enqueues the task indicated by the downnotify bits onto the multitasking queue in box 436.

The process described above in relation to boxes 422–436 occurs whenever IOP 160 receives an interrupt, whether or not it is in a halt state at the time. But if IOP 160 is executing another task when interrupted, the response to the interrupt in box 422 includes storing the necessary data to resume that task when the interrupting task has returned to a wait state. In effect, the IOP 160 maintains an additional interrupt queue of tasks which have been interrupted and are waiting to be completed, but this interrupt queue is managed by conventional Intel 80186 techniques, without the operating system. The multitasking queue maintained by the operating system, on the other hand, is in effect a linked list of data structures, each data structure containing the information necessary to execute a corresponding task. Tasks may be added to this multitasking queue during the steps shown in boxes 428, 432 and 436 or during other steps by the operating system.

IOP 160 next checks whether the multitasking queue is empty, in box 438. If not, the next task on the queue is run until it reaches a wait state, in box 440. If the wait state is a wait for system, as tested in box 422, the task is left in the queue, and IOP 160 again tests whether the multitasking queue is empty in box 438. If the wait state is not a wait for system, the task is first dequeued in box 444, and will remain dequeued until the operating system again enqueues it.

If the test in box 438 determines that the multitasking queue is empty, on the other hand, a special procedure called AllowPCE, which is part of Dispatcher 410, is run, in box 446. This procedure, therefore, is not strictly speaking a part of the operating system, but it is called by the operating system and is not an independent task like the Dispatcher tasks discussed below. AllowPCE tests whether a flag called RunPCE in system memory 126 is true, in box 448. This flag may be set either by Mesa CPU 112 or by IOP 160, and indicates whether PCE CPU 210 may be permitted to have control of IOP bus 140. If not, IOP 160 returns to its halt state in box 420. But if RunPCE is true, AllowPCE sends out signals which have the effect of permitting the PCE CPU 210 to run, because they release it from being held, and may lead to a change of state in accordance with FIG. 10, discussed above.

Figure 26:
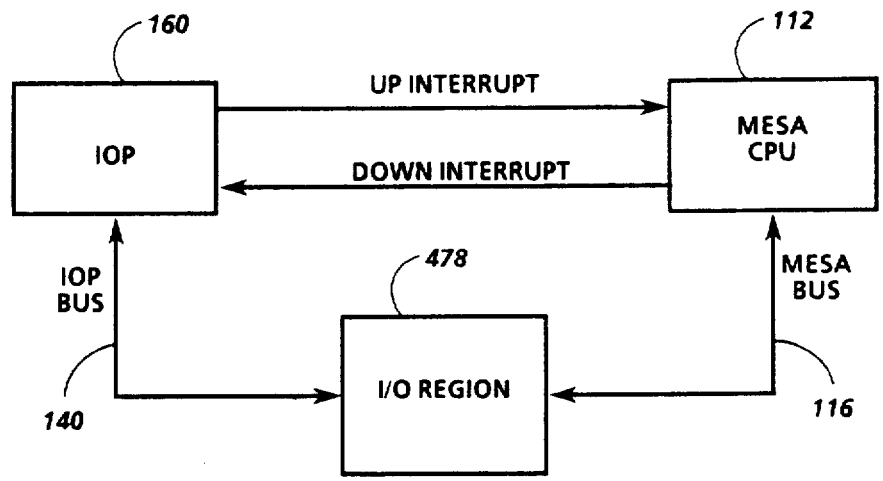
FIG. 26 is a block diagram showing communication between the IOP and Mesa CPU of FIG. 7.

FIG. 26 illustrates how downnotify, discussed above, occurs. As shown, Mesa CPU 112 has a direct down interrupt line for interrupting IOP 160. Prior to interrupting IOP 160, however, Mesa CPU 112 sets a bit in memory indicating which of a number of tasks is being downnotified. The downnotify bits or flags are in I/O region 478 in system memory 126, a region which Mesa CPU 112 and IOP 160 use to communicate to each other in relation to the I/O operations of PCE CPU 210. Therefore, IOP 160 may also use I/O region 478 to do an upnotify, in which case it sets an upnotify flag indicating which Mesa task is being upnotified and then signals Mesa CPU 112 on its direct up interrupt line.

V. Display and Emulated User Interface

The CPU in an IBM PC updates its display by writing to a display buffer memory. As discussed above in relation to memory emulation, PCE CPU 210 similarly writes to a display buffer in PCE memory space. In order to emulate the user interface of the IBM PC, however, it is necessary also to use the information in that display buffer to update a window on the 6085 display which emulates the PC screen. Display trapper 230 provides information about which part of the emulated PC screen must be updated, and a task on IOP 160 periodically checks for display update, upnotifying Mesa CPU 112 if display update is needed. In addition, a number of procedures executed by Mesa CPU 112 assist in emulating the display portion of the user interface.

Figure 27:
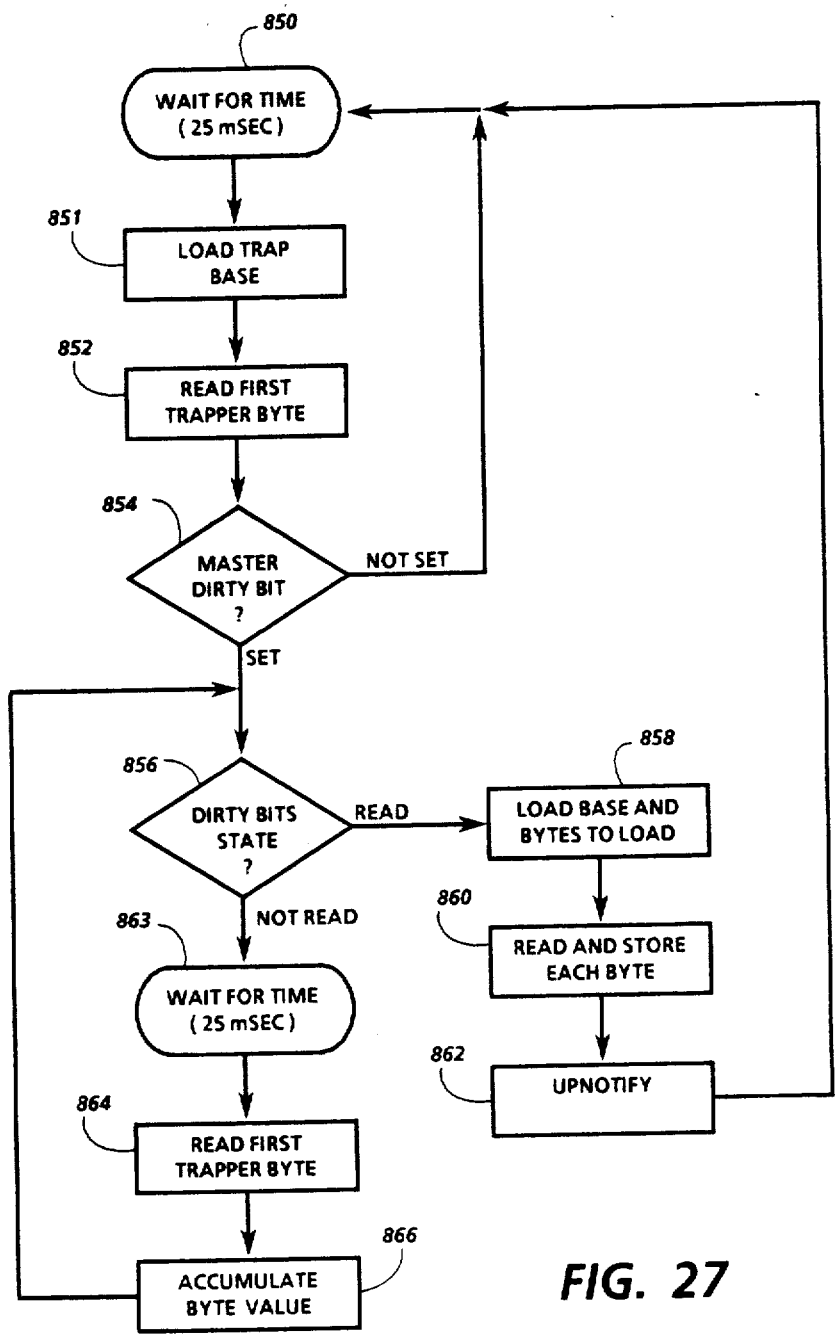
FIG. 27 is a flowchart of an IOP task which reads the display trapper contents according to FIG. 16 and helps emulate the PC user interface.

FIG. 27 shows the dirty bit scanning task on IOP 160 which periodically checks for display update by scanning the display trapper registers. During initialization, Dispatcher 410 calls a procedure in the display emulator which initializes and jams the dirty bit scanning task. During configuration, the task remains idle in order to avoid spurious activity, even though the user may have selected display type. Then, during boot, Dispatcher 410 calls another procedure in the display emulator which initializes ServiceReqBits so that no bits are set; initializes an ErrorCode in I/O region 478 so that no bits are set; initializes DirtyBitsState in I/O region 478 to Read, indicating that the dirty bits have been read by a Mesa procedure; and initializes display type dependent variables, based on the display type selected by the user during configuration and stored in I/O region 478, including the variable BytesToLoad indicating the number of scans needed to fill the I/O region dirty bit array for monochrome or color display and the variable trapBase indicating the series of display trapper ports to read to report dirty bits for a monochrome or color display buffer. Then this procedure calls the Restart macro to release the dirty bit scanning task from its jammed state. At this point, the scanning task begins to perform the sequence in FIG. 55 periodically.

The dirty bit scanning task enters a waitForTime state in box 850, in which it waits for an arbitrary period such as 25 msec. After that period, it loads the variable trapBase from I/O region 478 in box 851 and reads the first trapper byte, found at the address trapBase, in box 852. Reading a byte in a trapper register clears that register, as discussed above in relation to FIG. 16. Then the scanning task tests the first bit of the byte which it read, which is the master dirty bit, in box 854. If the master dirty bit is not set, no display update has occurred, so that the scanning task returns to a waitForTime state in box 850 to begin the loop again.

If the master dirty bit has been set, a further test in box 856 determines whether the value DirtyBitsState in I/O region 478 indicates that a Mesa procedure has read the dirty bits array. If the array has been read, its base and the value BytesToLoad indicating its size are loaded in box 858, and the scanning task proceeds to read and store each byte from the dirty bit registers into the array. Since the first byte has already been read, it is stored before reading the second byte, and so forth. When the reading and loading of the dirty bits array has been completed as appropriate for the type of display selected by the user, an upnotify is sent to Mesa CPU 112 in box 862 to indicate that the dirty bits array is ready to be read. The scanning task then returns to a waitForTime state in box 850.

When the test in box 856 determines that the dirty bits array has not been read, the scanning task enters another waitForTime state in box 863, after which it again reads the first trapper byte in box 864. The value read is accumulated with the previously stored value in box 866 by performing an OR operation on the two values, so that any additional dirty bits in that value will be added. Then the scanning task returns to repeat the test in box 856.

The task in FIG. 27 continues during operation of PCE CPU 210, so that the emulated display is continually updated according to the contents of the PCE display buffer memory. The contents of that buffer memory are obtained by procedures on Mesa CPU 112 which have previously obtained display configuration data and which proceed to update the display in response to an upnotify sent in box 862 in FIG. 27.

The procedure for updating the display is set up during initialization and whenever a change is made between text oriented and graphics oriented processing. The display is configured by setting up the initial display type and a procedure for either monochrome or color display update, based on the user selection. A process is forked off during booting to wait for upnotifies from the display emulator handler task in FIG. 27.

When an upnotify is received, the appropriate display update procedure is called. For a monochrome display, the displayed data includes only text data. The monochrome procedure begins by reading and storing ServiceRequestBits from I/O region 478. It checks that the error number is zero, and, if not, it calls an error service routine to handle the error whose code is received. If no error, the monochrome procedure loads data from I/O region 478 into a data record, including the ServiceRequestBits and, if dirtyBits in ServiceRequestBits is set, the dirty bits array. After reading the dirty bits array, the monochrome procedure sets DirtyBitsState to Read, discussed above. The monochrome procedure also loads the cursor position from I/O region 478 into the data record, and, if the extraWork flag in ServiceRequestBits is set, loads cursor shape data and blinking and intensity information into the data record. Finally, the monochrome procedure provides a pointer to the data record to a display painting procedure which, from the information in the data record, updates the emulated screen window.

Unlike a monochrome display, a color display may contain text data and graphics data. The color procedure also begins by reading and storing ServiceRequestBits from I/O region 478. It also checks the error number, calling an error service routine if necessary. If no error, the color procedure checks the display mode, which indicates one of four sections of code to handle display data processing.

The 40×25 section handles 40×25 text emulation. This section loads ServiceRequestBits into a data record and, if the dirty bit is set, also loads the dirty bits array, setting the DirtybitsState to Read. This section then loads the cursor position and active page data into the data record, and, if the extraWork flag in ServiceRequestBits is set, also loads the color active data, border color data, cursor shape data, blinking and intensity information into the data record. Then this section provides a pointer to the data record to the display painting procedure.

The 80×25 section is similar to the 40×25 section except that some constants are different.

The Medium Resolution Graphics Section handles medium resolution graphics text emulation. This section loads ServiceRequestBits into a data record and, if the dirty bit is set, also loads the dirty bits array, setting the DirtyBitsState to Read. This section checks the extraWork flag in ServiceRequestBits and, if it is set, loads color active data, color and palette data and intensity information into the data record. This section then provides a pointer to the data record to the display painting procedure.

The High Resolution Graphis Section handles high resolution graphics text emulation in a manner similar to the Medium Resolution Graphics Section. Some constants are different.

When the emulation session is terminated, the process waiting for upnotifies is halted, terminating display emulation.

VI. Further Developments

The embodiments of the invention described above may be modified in many ways within the scope of the invention. Host system 16 itself need not be a Mesa system, but could be any other system capable of performing the functions described above. The architecture of Host system 16 could be modified in many ways, including consolidating Mesa CPU 112 into a single VLSI chip, and similarly providing each memory/display controller on a single VLSI chip for each bank of memory.

The degree of which the emulating processor can execute a sequence of instructions executable by the IBM PC or other emulated system depends on the level at which those instructions are written. If directed to the ROMBIOS, those instructions will be executable to the extent the ROMBIOS loaded into PCE memory can execute them. The modifications to ROMBIOS noted above for emulation should not change the ability to execute instructions. Some sequences of instructions which bypass the ROMBIOS or are otherwise unconventional may not be executable, however. In general, loadable applications and operating systems executable on an IBM PC should be executable by a system emulating as described above, in distinction to a modifed ROMBIOS which may not be executable. It is within the scope of the invention, however, to modify the ROMBIOS loaded into PCE memory to make it capable of executing other sequences of instruction or conversely to make it capable of executing fewer sequences of instructions but more efficiently. Furthermore, modifications to provide signals such as the MCS and UCS signals, as described above, are also within the scope of the invention.

Many other modification, variations and improvements will be apparent from the above description, and the scope of the invention is not limited by the description, but only by the attached claims.

What is claimed:

1. A system for emulating a target system having a central processor for executing a set of target system instructions and a display memory for storing image data defining an image to be displayed, the emulating system comprising:

a host system having a host processor for executing a set of host system instructions different from the target system instructions; the host system further comprising display means for providing a display; and an emulating processor for executing a sequence of the target system instructions; the emulating processor providing signals during execution of the sequence of target system instructions, one of the signals being a display update signal indicating an update of the image data in the display memory of the target system; the display update signal being a memory access signal requesting access to a location in the display memory of the target system, the display update signal including a memory address;

the host system further comprising a host memory that includes a display memory region for storing the image data, the display memory region comprising a respective location for the location in the display memory of the target system; the image data at the respective location in the display memory region being accessed and updated in response to the display update signal;

the host system further comprising environment means for providing an environment for the emulating processor so that the emulating processor continues to execute the sequence of target system instructions; the environment means comprising display update monitoring circuitry connected for detecting when the emulating processor provides the display update signal and for obtaining display update monitoring data relating to the image data update indicated by the display update signal;

the host processor independently executing a sequence of the host system instructions while the emulating processor executes the sequence of target system instructions; the host processor being connected for receiving the display update monitoring data and for controlling the display means; the host processor, in executing the sequence of host system instructions, operating to cause the display means to provide the display in accordance with the display update monitoring data.

2. The system of claim 1 in which another one of the signals provided by the emulating processor during exeuction of the sequence of target system instructions is an I/O operation signal requesting an I/O operation; the environment means further comprising I/O monitoring circuitry for detecting when the emulating processor provides the I/O operation signal and for obtaining I/O operation data relating to the requested I/O operation from the I/O operation signal.

3. The system of claim 1 in which the host processor accesses the respective location in the display memory region according to the display update monitoring data, retrieves the updated image data, and causes the display means to display an updated image according to the updated image data from the respective location.

4. The system of claim 3 in which the display means includes a screen, the host processor causing the display means to display the updated image in a part of the screen, the host processor causing the display mens to display an image characteristic of the host system in all of the screen except the part in which the updated image is displayed.

5. The system of claim 4 in which the part of the screen is a window.

6. The system of claim 1 in which the display update monitoring circuitry obtains first and second display update monitoring data from the memory address in the display update signal, the first monitoring data indicating a sector of the display memory of the target system and the second monitoring data including a plurality of bits, each bit being for a respective part of the sector indicated by the first monitoring data, one of the respective parts of the sector including a location updated by the display update signal, the bit for the respective part that includes the updated location being set in the second monitoring data while the bits for the other respective parts are not set.

7. The system of claim 6 in which the display update monitoring circuitry further comprises an update memory for storing the set bit from the second monitoring data, the update memory comprising a respective bit register for the sector indicated by the first monitoring data, the update memory being addressed by the first monitoring data to access the respective bit register, the respective bit register including a stored bit for the respective part of the sector of the set bit; the display update monitoring circuitry further comprising a gate that provides a result bit indicating the logical OR of the stored bit and the set bit, the result bit then replacing the stored bit in the bit register.

8. The system of claim 1 in which the environment means further comprises mapping means for receiving the display update signal and for mapping the memory address to the respective location in the host memory so that the respective location is accessed in response to the display update signal.

9. The system of claim 8 in which the host processor accesses the display memory region for retrieving the updated image data at the respective location.

10. A system for emulating a target system having a central processor for executing a set of target system instructions and a display memory for storing image data defining a target system image to be displayed, the emulating system comprising:

- a host system having a host processor for executing a set of host system instructions different from the target system instructions; the host system further comprising display means for providing a display, the display means including a screen; the host processor, in executing a sequence of the host system instructions, causing the display means to display a host system image on the screen, the host system image including a window displayed on a part of the screen and display features characteristics of the host system displayed outside of the part of the screen; the target system image having display features characteristic of the target system which are different from the display features characteristic of the host system; and
- an emulating processor for executing a sequence of the target system instructions; the emulating processor providing signals during execution of the sequence of target system instructions, one of the signals being a display update signal indicating an update of the image data in the display memory of the target system;

the host system further comprising environment means for providing an environment for the emulating processor so that the emulating processor continues to execute the sequence of target system instructions; the environment means comprising display update monitoring circuitry connected for detecting when the emulating processor provides the display update signal and for obtaining display update monitoring data relating to the image data update indicated by the display update signal;

the host processor independently executing a sequence of the host system instructions while the emulating processor executes the sequence of target system instructions; the host processor, in executing the sequence of host system instructions, operating to cause the display means to provide the display the target system image and the display features characteristic of the host system being displayed simultaneously; the host processor further being connected for receiving the display update monitoring data for controlling the display means, the host processor causing the target system image to be updated in accordance with the display update monitoring data.

11. A system for emulating a target system having a central process for executing a set of target system instructions and a display memory for storing image data defining an image to be displayed, the emulating system comprising:

- a host system having a host processor for executing a set of host system instructions different from the target system instructions; the host system further comprising display means for providing a display; and
- an emulating processor for executing a sequence of the target system instructions; the emulating processor providing signals during execution of the sequence of target system instructions, one of the signals being a display update signal indicating an update of the image data in the display memory of the target system; the display update signal including an address of a location in the display memory of the target system;

the host system further comprising environment means for providing an environment for the emulating processor so that the emulating processor continues to execute the sequence of target system instructions; the environment means comprising display update monitoring circuitry connected for detecting when the emulating processor provides the display update signal by monitoring the address in the display update signal and for obtaining display update monitoring data relating to the update of the image data indicated by the display updates the signal from the address in the display update signal; the display update monitoring circuitry comprising an update memory with a plurality of locations for storing the display update monitoring data, each location in the update memory being for storing display update monitoring data for a respective set of locations in the display memory of the target system; upon receiving the display update signal, the display update monitoring circuitry accessing one of the locations in the update memory to store display update monitoring data obtained from the address in the display update signal, the respective set of display memory locations of the accessed location in the update memory including the address in the display update signal;

the host processor independently executing a sequence of the host system instructions while the emulating processor executes the sequence of target system instructions; the host processor being connected for receiving the display update monitoring data and for controlling the display means; the host processor, in executing the sequence of host system instructions, operating to cause the display means to provide the display in accordance with the display update monitoring data.

12. The system of claim 11 in which each location in the update memory comprises a bit indicating, when set, that a display update signal has been provided with an address in the respective set of locations in the display memory of the target system; upon receiving the display update signal, the display update monitoring circuitry accessing one of the bits in the update memory according to the address in the display update signal, the respective set of locations of the accessed bit including the address in the display update signal; the display update monitoring circuitry setting the accessed bit.

13. The system of claim 12 in which the host system further comprises a host memory that includes a display memory region for the emulating processor, the display memory region storing the image data in a plurality of locations, each location in the display memory region being a respective location for a location in the display memory of the target system; the image data in the display memory region being updated in response to the display update signal; the environment means further comprising a third processor for retrieving the display update monitoring data from the bits of the update memory and for notifying the host processor which bits have been set; the host processor accessing the respective locations in the display memory region for the set of locations for which each of the set bits indicates that a display update signal has been provided; the host processor obtaining updated image data from the accessed locations.

14. The system of claim 13 in which the third processor is further for clearing the bits of the update memory after retrieving the display update monitoring data from them.

15. The system of claim 13 in which the display update monitoring circuitry further comprises a master bit store including a single bit of the display update monitoring data, the display update monitoring circuitry further setting the single bit in the master bit store to indicate that one of the bits in the update memory has been set; the third processor further retrieving the single bit of the display update monitoring data and determining whether to retrieve the display update monitoring data from the bits of the update memory according to whether the single bit was set.

* * * * *